United States Patent
Zee et al.

(10) Patent No.: US 10,893,455 B2
(45) Date of Patent: Jan. 12, 2021

(54) HANDOVER IN A WIRELESS COMMUNICATION NETWORK WITH NETWORK SLICES

(71) Applicant: Telefonaktiebolaget LM Ericsson (publ), Stockholm (SE)

(72) Inventors: Oscar Zee, Stockholm (SE); Walter Müller, Upplands Väsby (SE); Elena Myhre, Järfälla (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 16/088,344

(22) PCT Filed: Apr. 1, 2016

(86) PCT No.: PCT/SE2016/050275
§ 371 (c)(1),
(2) Date: Sep. 25, 2018

(87) PCT Pub. No.: WO2017/171598
PCT Pub. Date: Oct. 5, 2017

(65) Prior Publication Data
US 2020/0305054 A1    Sep. 24, 2020

(51) Int. Cl.
*H04W 36/32* (2009.01)
*H04W 76/11* (2018.01)
(Continued)

(52) U.S. Cl.
CPC ....... *H04W 36/32* (2013.01); *H04W 36/0058* (2018.08); *H04W 36/0061* (2013.01);
(Continued)

(58) Field of Classification Search
CPC ..... H04W 36/32; H04W 76/30; H04W 76/11; H04W 36/0058; H04W 36/0061;
(Continued)

(56) References Cited

U.S. PATENT DOCUMENTS 10,616,820 B2 *   4/2020  Youn ................ H04W 8/02
2014/0370894 A1  12/2014  Hosdurg et al.
(Continued)

FOREIGN PATENT DOCUMENTS

EP       2 255 563 B1      2/2012
WO    WO 2009/120127 A1   10/2009

OTHER PUBLICATIONS

Notification of Transmittal of the International Search Report and the Written Opinion of the International Searching Authority for International Application No. PCT/SE2016/050275 dated Aug. 30, 2016.

(Continued)

*Primary Examiner* — Marisol Figueroa
(74) *Attorney, Agent, or Firm* — Sage Patent Group

(57) ABSTRACT

Methods are performed by a first radio node for handling mobility of a wireless device in a communication network having partitioned sets of functionalities. Each set of functionalities belongs to a network slice and is separated from other sets of functionalities out of a total set of functionalities. The first radio node transmits information indicating one or more slice identities supported by the first radio node to a second radio node. The first radio node receives information indicating one or more slice identities supported by the second radio node from the second radio node. The first radio node obtains a support indication indicating the slice ID the wireless device supports, during a connection setup of the wireless device to the network slice. The first radio node initiates a mobility procedure towards the second
(Continued)

radio node taking the information in the received response message and the obtained support indication into account.

27 Claims, 19 Drawing Sheets

(51) Int. Cl.
 H04W 84/04 (2009.01)
 H04W 76/30 (2018.01)
 H04W 36/00 (2009.01)
(52) U.S. Cl.
 CPC ............ *H04W 76/11* (2018.02); *H04W 76/30* (2018.02); *H04W 84/042* (2013.01)
(58) Field of Classification Search
 CPC ... H04W 84/042; H04W 84/04; H04W 88/10; H04W 88/18
 See application file for complete search history.

(56) References Cited

U.S. PATENT DOCUMENTS

2020/0022047 A1\* 1/2020 Kim ................. H04W 36/08
2020/0059842 A1\* 2/2020 Vrzic ................ H04W 36/26

OTHER PUBLICATIONS

NTT Docomo, "Solution to support a UE with simultaneous connections to multiple Network Slices," 3GPP, S2-161043, SA WG2 Meeting #113AH, Temporary Document, dated Feb. 18, 2016, 4 pages.
3GPP TR 23.799 V0.3.0, "3$^{rd}$ Generation Partnership Project; Technical Specification Group Services and System Aspects; Study on Architecture for Next Generation System (Release 14)," Technical Report dated Mar. 14, 2016, 52 pages.

\* cited by examiner

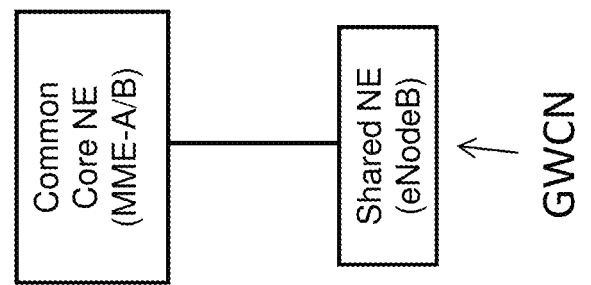
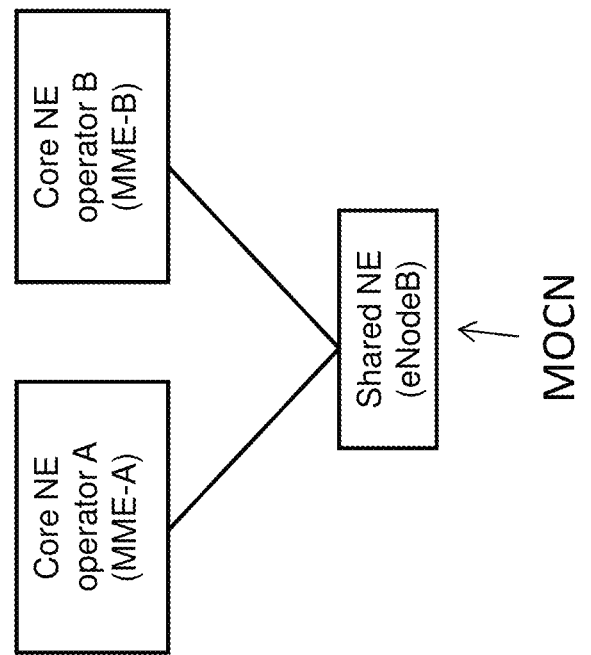
Fig. 7

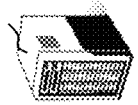
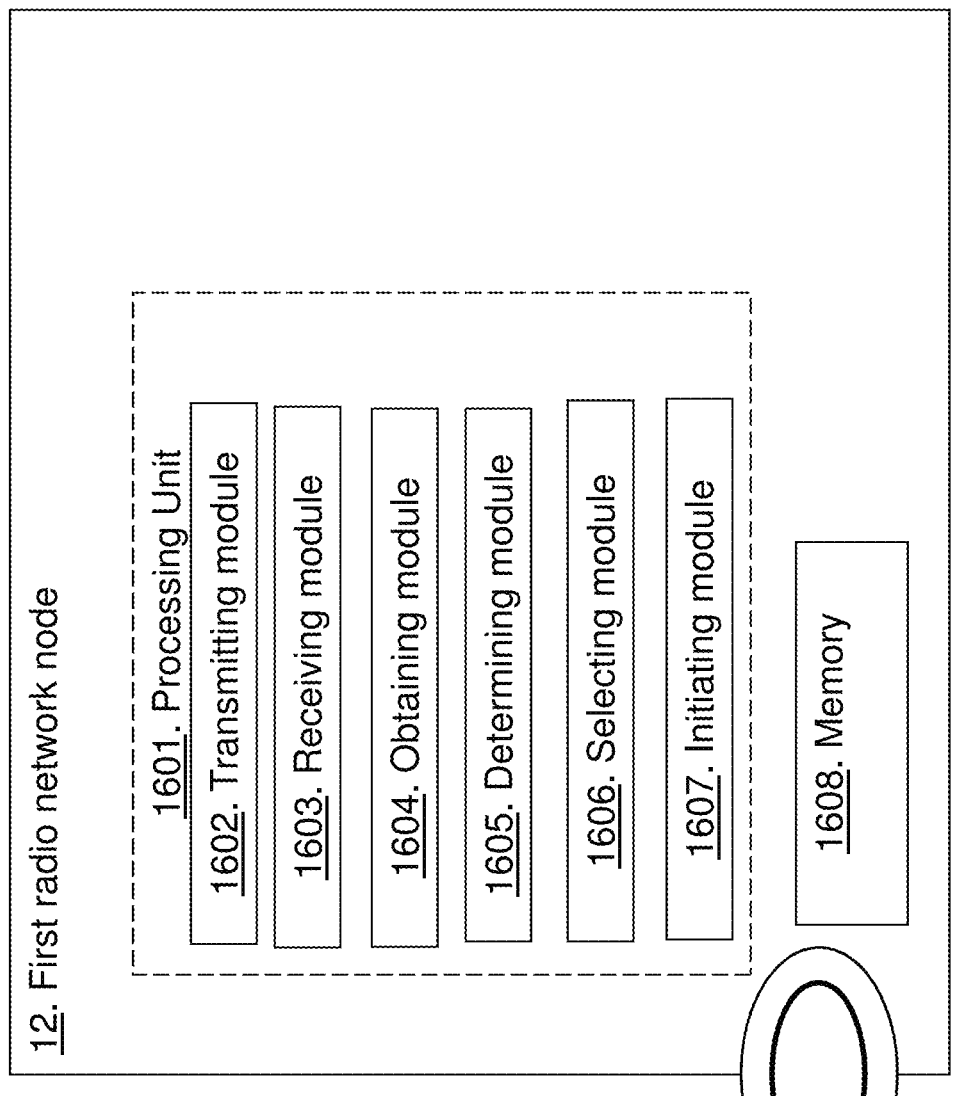
Fig. 16 ic
HANDOVER IN A WIRELESS COMMUNICATION NETWORK WITH NETWORK SLICES

CROSS REFERENCE TO RELATED APPLICATION

This application is a 35 U.S.C. § 371 national stage application of PCT International Application No. PCT/SE2016/050275, filed on Apr. 1, 2016, the disclosure and content of which is incorporated by reference herein in its entirety.

TECHNICAL FIELD

Embodiments herein relate to a core network node, radio network nodes and methods performed therein for communication. Furthermore, a computer program and a computer readable storage medium are also provided herein. In particular, embodiments herein relate to handling mobility procedures for a wireless device in a communication network.

BACKGROUND

In a typical communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises radio access nodes, such as eNBs, Home eNBs, which are also referred to as HeNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface and/or via an X2 GW. The radio network nodes are also connected by means of the S1 interface to the EPC comprising EPC nodes, such as MME, S-GW and HeNB GateWays (GW). More specifically the radio network nodes are connected to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application layer protocol between the radio network node and the MME and SCTP for example guarantees delivery of signaling messages between MME and the radio network node. The transport network layer is based on Internet Protocol (IP).

A subset of the S1 interface provided functions are:
- S1-interface management functions such as S1 setup, error indication, reset and the radio network node and MME configuration update.
- UE Context Management functionality such as Initial Context Setup Function and UE Context Modification Function.
- E-UTRAN Radio Access Bearer (E-RAB) Service Management functions e.g. Setup, Modify, Release.
- Mobility Functions for wireless devices in EPS Connection Management (ECM)-CONNECTED, e.g. Intra-LTE Handover and inter-3GPP-Radio Access Technology (RAT) Handover.
- S1 Paging function.
- Non Access Stratum (NAS) Signaling Transport function.

Establishment of the S1-MME interface on S1AP protocol level is performed using an S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. An INITIAL CONTEXT SETUP RESPONSE message is sent by eNB to the MME confirming the setup. Current assumption is that the RAN-CN split is similar for 5G as for 4G, implying an (evolved) S1 interface.

Radio Resource Control (RRC) States

RRC, which is terminated in the radio network node on the network side from the wireless device, performs functions like:

Broadcast
Paging
RRC connection management
Resource Block (RB) control
Mobility functions
Wireless device measurement reporting and control The RRC states are:
RRC_IDLE
RRC_CONNECTED A wireless device is in the RRC_CONNECTED state when an RRC connection has been established between the wireless device and the radio network node. If this is not the case, i.e. no RRC connection is established, the wireless device is in the RRC_IDLE state.

EPS Mobility Management (EMM) and EPS Connection Management (ECM) states

The EPS Mobility Management (EMM) states describe the Mobility Management states that result from the mobility management procedures e.g. Attach and Tracking Area Update procedures.

Two major EMM states are:
EMM-DEREGISTERED
EMM-REGISTERED.

The EPS Connection Management (ECM) states describe the signaling connectivity between the wireless device and the EPC, which includes both RRC connection between the wireless device and radio network node and S1 connection, i.e. S1AP association, between radio network node and MME.

Two major ECM states are:
ECM-IDLE.
ECM-CONNECTED.

In general, the ECM and EMM states are independent of each other. Transition from EMM-REGISTERED to EMM-DEREGISTERED can occur regardless of the ECM state, e.g. by explicit detach signaling in ECM-CONNECTED or by implicit detach locally in the MME during ECM-IDLE. However there are some relations, e.g. to transition from EMM-DEREGISTERED to EMM-REGISTERED the wireless device has to be in the ECM-CONNECTED state.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

As expected by leading operators and vendors in Next Generation Mobile Networks (NGMN) association, diverse applications or services are expected to be provided by 5G networks. 5G will support countless emerging use cases with a high variety of applications and variability of their performance attributes: from delay-sensitive video applications to ultra-low latency, from high speed entertainment applications in a vehicle to mobility on demand for connected objects, and from best effort applications to reliable and ultra-reliable ones such as health and safety. Furthermore, use cases will be delivered across a wide range of devices, e.g., smartphones, wearables, MTCs, and across a fully heterogeneous environment.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing and network sharing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. Obviously, different use cases put different requirements to future networks. Examples of such requirements may include acceptable interruption time, reliability and availability, acceptable latency, data rate, as well as cost per user. It would be quite difficult or cost-wise impossible to deploy a common network service to fulfill such extremely diverse requirements. In the situation, network slicing was proposed as a concept to fulfill rich requirements from various 5G use cases. Meanwhile, the network slicing concept is getting widely recognition in NGMN. A network slice supports the communication service of a particular connection type with a specific way of handling C-plane and U-plane for the service. A 5G slice could be composed by a collection of 5G network functions and possibly specific RAT with specific settings that are combined together for the specific use case or business model. It should be noted that not all slices contain the same network functions. A specific network service can be instantiated according to on demand requirements for third party users/operators and the business policy between the network service providers and network the service consumers. Thus, an operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator services and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
    Evolved communication services
    Cloud services
    Extended mobility and coverage
Mission critical Machine Type Communication
    Intelligent traffic systems
    Smart grid
    Industrial applications
Massive Machine Type Communication
    Sensors/actuators
    Capillary networks
Media
    Efficient on-demand media delivery
    Media awareness
    Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of Enterprise services
Government services, e.g. national and/or public safety
Verticals industries, e.g. automation, transportation
Residential users These different users and services are also expected to put new requirements on the network. FIG. 3 shows an example of a network slicing for a case when there exists different network slices in the core network for MBB, Massive MTC and Critical MTC. In other words, the network slices may comprise separate core network instances supporting the different network slices. In addition, it is also possible that parts of the EPC are shared between the different network slices. One such example of shared EPC functionality may be a core network node, such as a MME.

Network slicing introduces the possibility that the network slices are used for different services and use cases and there is a need to enable usage of this mechanism for wireless devices in the communication network to improve the performance of the communication network. Thus, Network slicing consists of defining, realizing and operating end-to-end logical networks by means of dedicated and/or shared resources in the Core Network and/or the Radio Access Network and associated management system(s). A problem is to enable a network slice capable wireless device to perform mobility, e.g. cell reselection or cell reselection, in the communication network to improve the performance of the communication network.

SUMMARY

An object of embodiments herein is to provide a method for reducing the risk of erroneous and rejected mobility procedures for a wireless device and thereby improve the performance and reliability of the communications network in an efficient manner.

According to an aspect of embodiments the object is achieved by a method performed by a first radio network node for handling mobility of a wireless device in a communication network. The first radio network node transmits a message comprising information indicating one or more slice identities supported by the first radio network node to a second radio network node in the communication network. The first radio network node receives a response message comprising information indicating one or more slice identities supported by the second radio network node from the second radio network node in the communication network. The first radio network node obtains a support indication indicating the slice ID the wireless device supports, during a connection setup of the wireless device to the network slice. The first radio network node determines to initiate a mobility procedure towards the second radio network node, taking the information in the received response message and the obtained support indication into account.

According to another aspect of embodiments herein the object is achieved by a method performed by a second radio network node for handling mobility of a wireless device in a communication network. The communication network comprises partitioned sets of functionalities. Each set of functionalities belongs to a network slice. A set of functionalities is separated from other sets of functionalities out of a total set of functionalities in the communication network. The second radio network node receives a message comprising information indicating one or more slice identities supported by the first radio network node from a first radio network node in the communication network. The second radio network node transmits a response message comprising information indicating one or more slice identities supported by the second radio network node to the first radio network node in the communication network.

According to a further aspect the object is achieved by providing a method performed by a core network node for handling mobility of a wireless device in a communication network. The communication network comprises partitioned sets of functionalities. Each set of functionalities belongs to a network slice. A set of functionalities is separated from other sets of functionalities out of a total set of functionalities in the communication network. The core network node transmits information to the first radio network node, which information indicates equivalent networks and slices, and slices allowed or not allowed to use for the wireless device.

Embodiments herein further relate to a first radio network node for handling mobility of a wireless device in a communication network. The communication network comprises partitioned sets of functionalities. Each set of functionalities belongs to a network slice. A set of functionalities is separated from other sets of functionalities out of a total set of functionalities in the communication network. The first radio network node is configured to transmit a message comprising information indicating one or more slice identities supported by the first radio network node, to a second radio network node in the communication network. The first radio network node is further configured to receive, from the second radio network node in the communication network, a response message comprising information indicating one or more slice identities supported by the second radio network node. The first radio network node is further configured to obtain, during a connection setup of the wireless device to the network slice, a support indication indicating the slice ID the wireless device supports. The first radio network node is further configured to determine to initiate a mobility procedure towards the second radio network node taking the information in the received response message and the obtained support indication into account.

Embodiments herein further relate to a second radio network node for handling mobility of a wireless device in a communication network. The communication network comprises partitioned sets of functionalities. Each set of functionalities belongs to a network slice. A set of functionalities is separated from other sets of functionalities out of a total set of functionalities in the communication network. The second radio network node is configured to receive, from a first radio network node in the communication network, a message comprising information indicating one or more slice identities supported by the first radio network node. The second radio network node is configured to transmit to the first radio network node in the communication network, a response message comprising information indicating one or more slice identities supported by the second radio network node.

Embodiments herein further relate to a core network node for handling mobility of a wireless device in a communication network. The communication network comprises partitioned sets of functionalities. Each set of functionalities belongs to a network slice. A set of functionalities is separated from other sets of functionalities out of a total set of functionalities in the communication network. The core network node is configured to transmit information to the first radio network node, which information indicates equivalent networks and slices, and slices allowed or not allowed to use for the wireless device.

It is furthermore provided herein a computer program comprising instructions, which, when executed on at least one processor, cause the at least one processor to carry out any of the methods above, as performed by the first network node or the second network node. It is additionally provided herein a computer-readable storage medium, having stored thereon a computer program comprising instructions which, when executed on at least one processor, cause the at least one processor to carry out the method according to any of the methods above, as performed by the first network node or the second network node.

Embodiments herein introduce an efficient manner of reducing the risk of erroneous and rejected connection requests for a wireless device in connected mode, which is performing mobility procedures in a communications network. By indicating to the source radio network node which cells in other radio network nodes in the communications network support the network slice supported by the wireless device, the source network node can take this information into account in order to find a suitable cell to perform mobility procedures to, such as e.g. a handover, a release with redirection or a RRC-connection re-establishment. Thereby, unnecessary signaling from the wireless device to cells and/or RAN nodes which do not support the network slice of the wireless device is minimized, which increases the performance of the communications network. Furthermore, the risk of the wireless device being handed over to an erroneous cell is reduced which improves the reliability of the communications network.

Embodiments herein introduce an efficient manner of coordinating different identifiers between PLMNs when multiple PLMNs with slices are hosted in different RANs. By introducing a combination of network identity, such as a PLMN-ID, and a slice ID to indicate a particular slice, and further introducing an equivalent PLMN-ID and slice-ID information in different signaling procedures, the slice IDs do not have to be unique across different networks, such as e.g. PLMNs, which allows a reuse of slice ID values. Further, since Slice IDs do not need to be coordinated across different PLMNs the amount of cross-PLMN configurations can be minimized, thereby reducing the costs and the work load of running such networks. The embodiments herein also introduce an efficient way of mapping registered PLMNs and slices in the registered PLMN, to equivalent slices in an equivalent network.

BRIEF DESCRIPTION OF THE DRAWINGS

Embodiments will now be described in more detail in relation to the enclosed drawings, in which:

FIG. 7 is a schematic overview depicting examples of standardized architectures for sharing Radio Access Networks;

FIG. 16 is a block diagram depicting a first radio network node according to embodiments herein;

DETAILED DESCRIPTION

Figure 1:
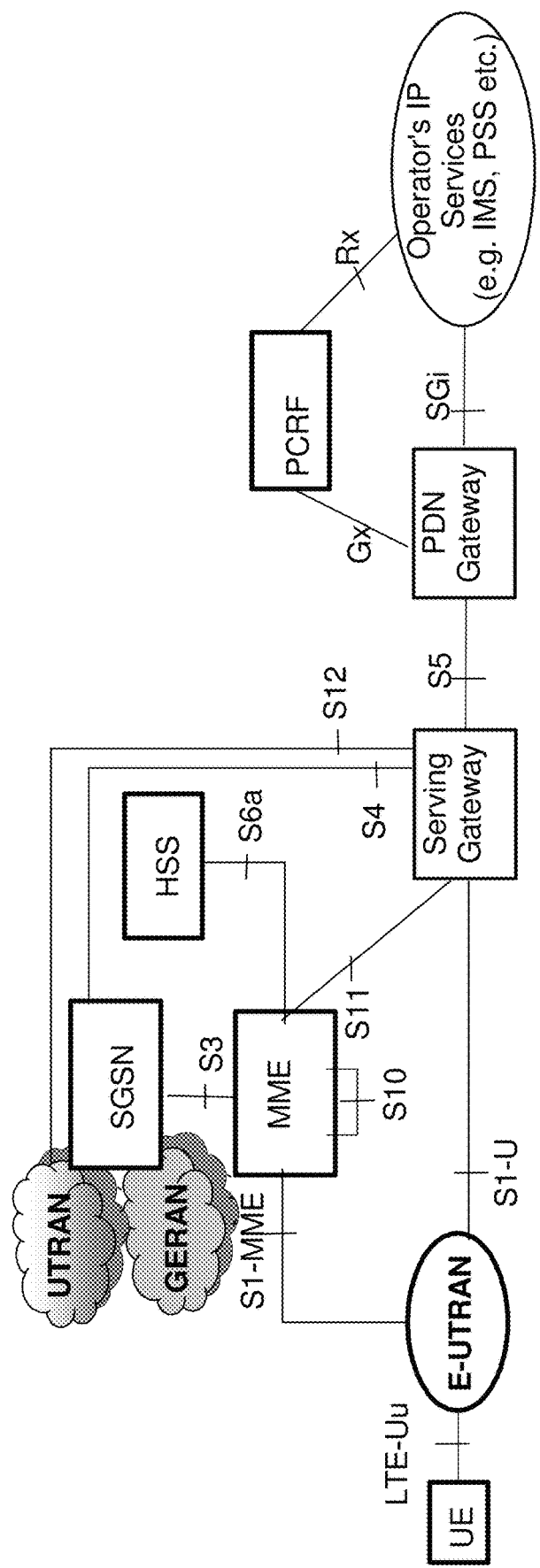
FIG. 1 is a schematic overview depicting a communication network according to prior art.
Figure 2:
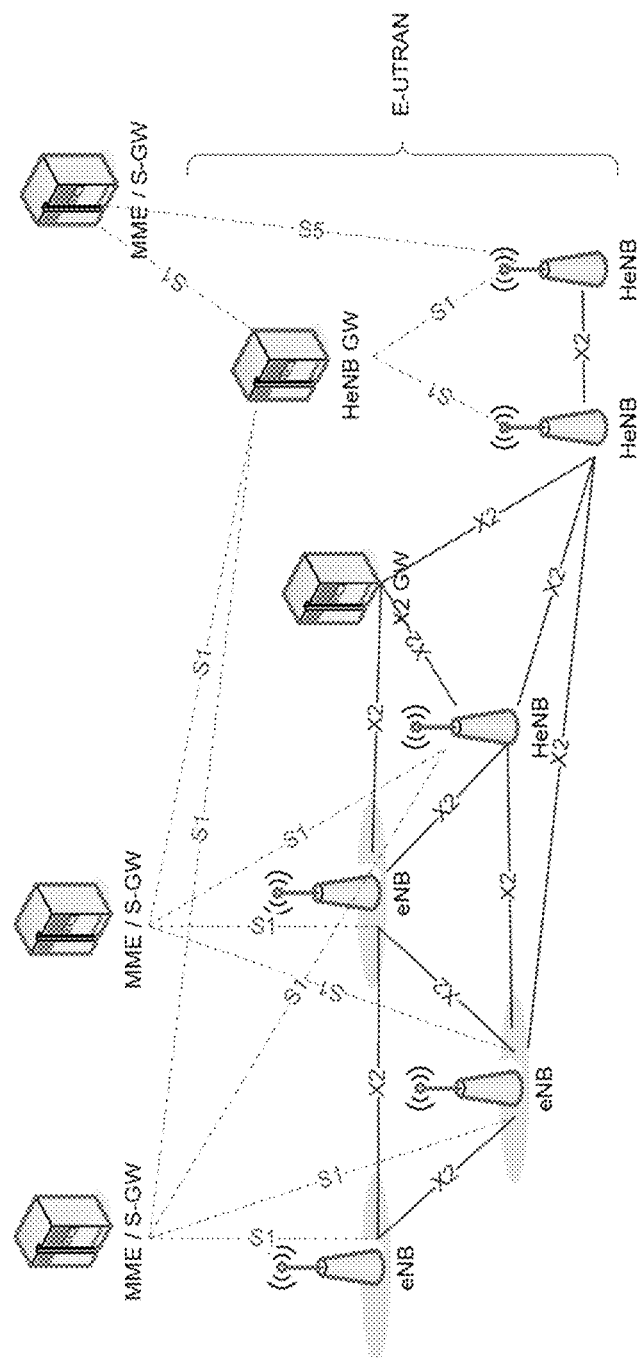
FIG. 2 is a schematic overview depicting a radio access network in connection with a core network.
Figure 3:
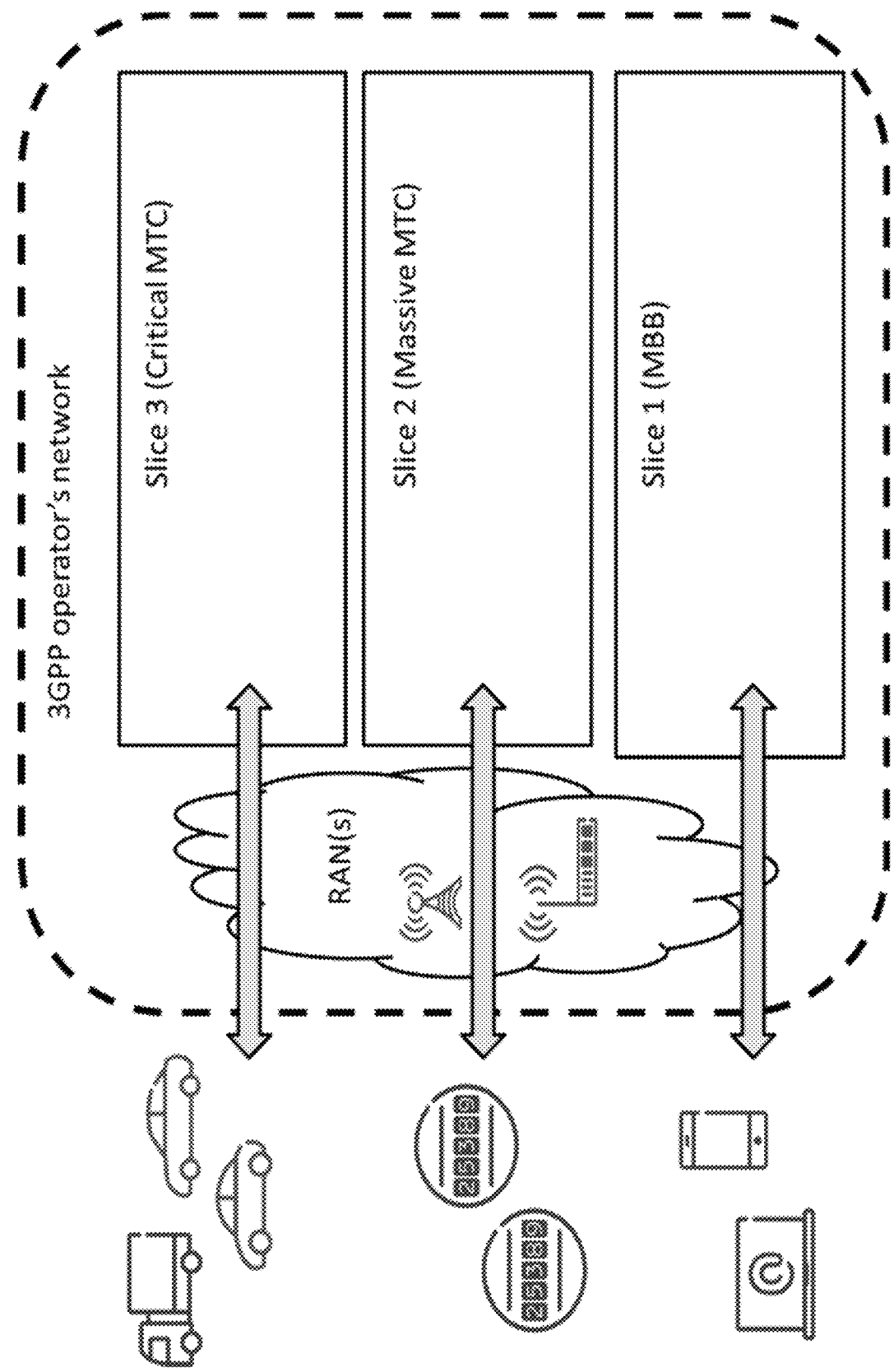
FIG. 3 is a schematic overview depicting an example of network slicing with slice specific core network instances according to prior art.

As part of developing embodiments herein a problem has first been identified. A management system is disclosed in FIG. 4. The management system may comprise a domain manager (DM), also referred to as the operation and support system (OSS) node managing the radio network nodes. A DM may further be managed by a network manager (NM). The radio network nodes may be interfaced by X2 and/or S1 interfaces, whereas an interface between two DMs is referred to as Itf-P2P. The management system may configure the radio network nodes, as well as receive observations associated with features in the radio network nodes. For example, DM observes and configures radio network nodes, while NM observes and configures DM, as well as the radio network nodes via DM. By means of configuration via the DM, NM and related interfaces, functions over the X2 and S1 interfaces can be carried out in a coordinated way throughout the RAN, eventually involving the Core Network, i.e. MME and S-GWs.

It is not yet specified by 3GPP if and how the LTE architecture should evolve to meet the challenges of the 5G time frame. It is assumed that there will be evolved counterparts of the S1, X2 and Uu interfaces and that any new RAT would be integrated with the LTE radio interface at RAN level in a similar fashion as the way LTE Dual Connectivity is defined. Embodiments herein will work for both an LTE-like architecture and a new architecture based on an evolution of the X2 and S1 interface.

Network slicing is about creating logically separated partitions of the network, addressing different business purposes. These "network slices" are logically separated to a degree that they can be regarded and managed as networks of their own.

The network slicing applies to both LTE based networks and 5G Radio Access Technology (RAT). The network slicing supports business expansion, i.e. improving the cellular operator's ability to serve other industries, e.g., by offering connectivity services with different network characteristics, such as performance, security, robustness, and complexity. One shared Radio Access Network (RAN) infrastructure, comprising one or more RANs, connects to several Evolved Packet Core (EPC) instances, e.g. one EPC instance per network slice. As the EPC functions are being virtualized, it is assumed that the operator shall instantiate a new Core Network (CN) when a new slice should be supported.

The S1-MME interface is used for control plane between eNodeB/E-UTRAN and MME. The main protocols used in this interface are S1 Application Protocol (S1AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
  S1-interface management functions such as S1 setup, error indication, reset and the radio network node and MME configuration update.
  UE Context Management functionality such as Initial Context Setup Function and UE Context Modification Function.

E-UTRAN Radio Access Bearer (E-RAB) Service Management functions e.g. Setup, Modify, Release.

Mobility Functions for wireless devices in EPS Connection Management (ECM)-CONNECTED, e.g. Intra-LTE Handover and inter-3GPP-Radio Access Technology (RAT) Handover.

S1 Paging function.

Non Access Stratum (NAS) Signaling Transport function.

Once a network device, such as a UE, has been registered to a network, such as a Public Land Mobile Network (PLMN), and the network device enters RRC/ECM connected mode, in which the network device may exchange data with the network, several mobility related procedures may occur. Such procedures may e.g. be a handover, a release and redirection of the network device from one radio network node to a second radio network node or a RRC-connection re-establishment. These procedures are described in detailed way in 3GPP TS 36.331, 3GPP TS 23.401. In connected mode, the RAN selects the cell to serve the UE. This selection is mainly based on:

Radio and load conditions of cells in different frequency layers

Optionally, if information is provided when selecting a cell as target for handover or release with redirection, the RAN and/or the eNB may consider forbidden and/or allowed TA for allowed PLMNs, which allowed PLMNs are determined based on current registered PLMNs and any possible equivalent PLMNs.

The wireless device should also be able to initiate NAS procedure, such as e.g. Tracking Area Update, also in connected mode if necessary.

Figure 4:
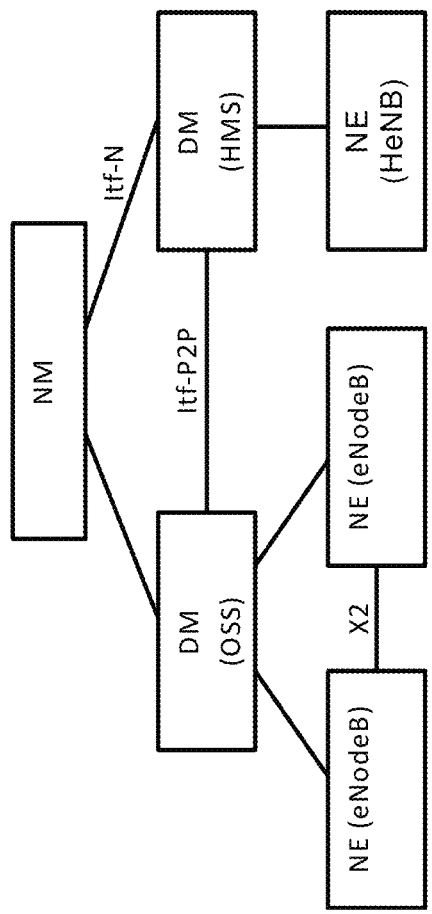
FIG. 4 is a schematic overview depicting a management system architecture for a communications network.
Figure 5:
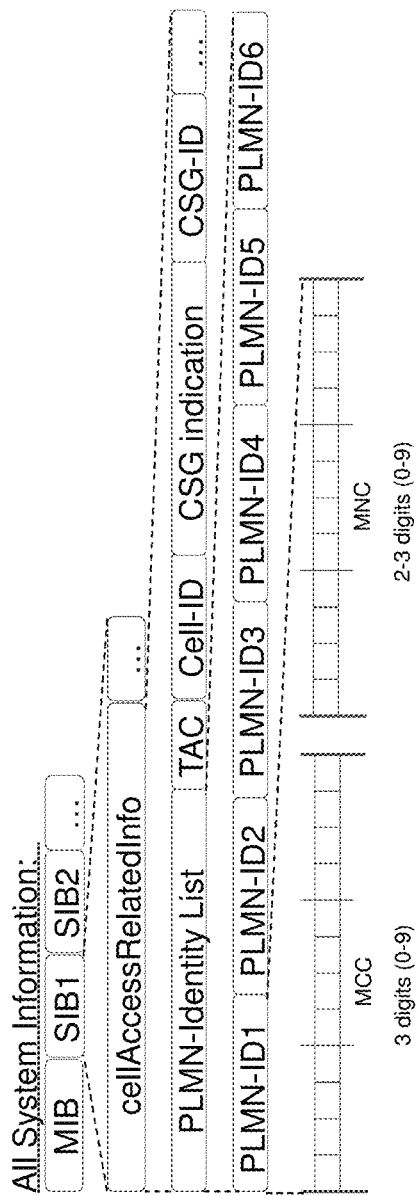
FIG. 5 is a schematic overview for a System Information transmitted in the network.

An example of the system information received from the RAN node is shown in FIG. 5. All system information comprises a MasterInformationBlock (MIB) and multiple different SystemInformationBlock (SIB) Types. The main parts of existing LTE/E-UTRAN SystemInformationBlock Type1 (SIB1) are shown in FIG. 4. The cellAccessRelatedInfo may contain up to 6 different PLMN-IDs to support network sharing. A single Tracking Area Code (TAC) is used for all the different PLMN-IDs to build up to 6 different Tracking Area Identities. In addition, Cell Identity and CSG related information are examples of additional information included in the SIB1. The SIB1 may further contain multiple other information elements as described in 3GPP TS 36.331.

Figure 6:
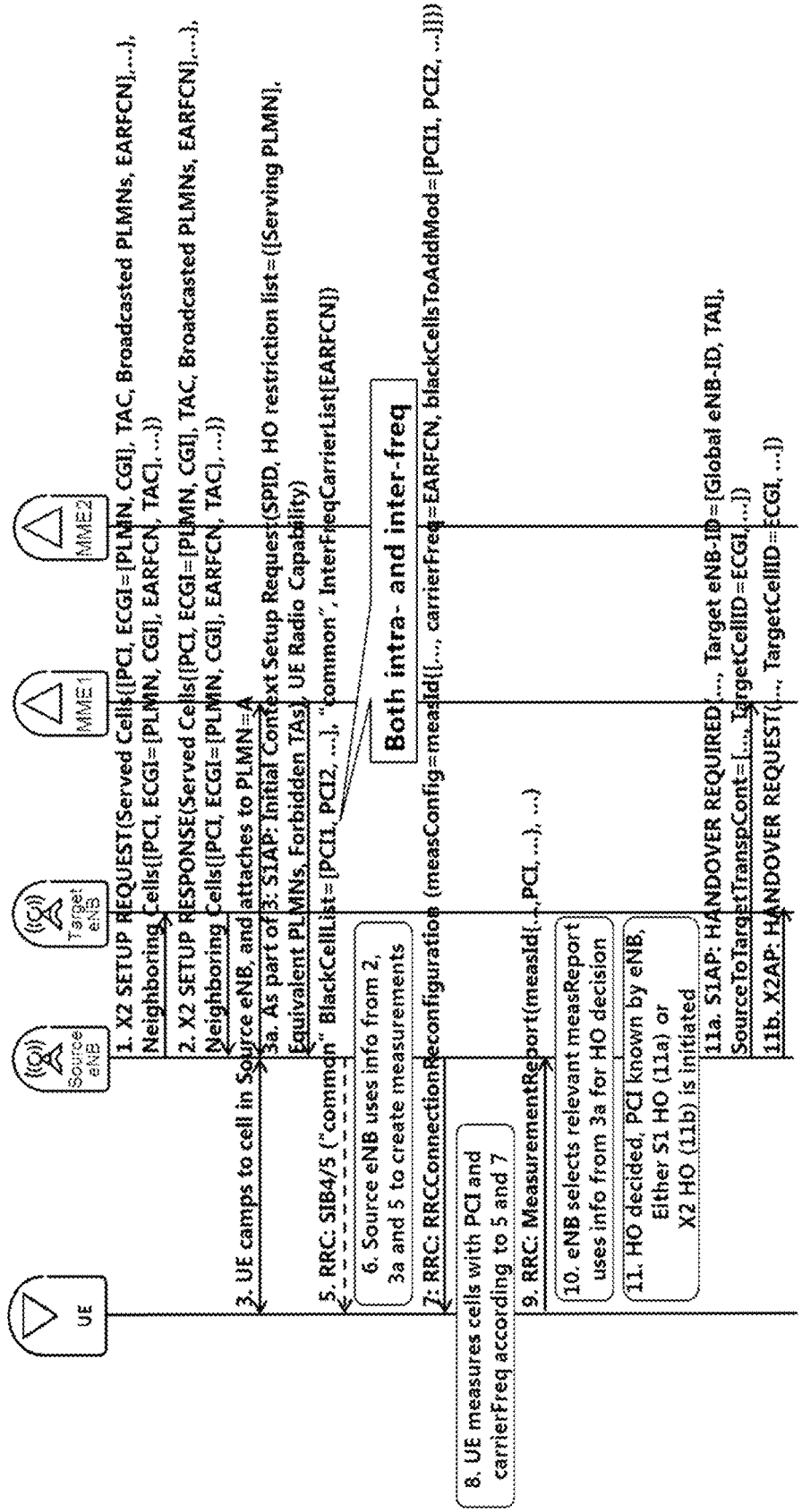
FIG. 6 is a signaling diagram depicting a mobility procedure according to prior art.

The radio network node receives information from different entities, which information is useful in connected mode mobility functions. An example on how connected mode mobility functions are performed in the network is shown in FIG. 6. FIG. 6 shows a scenario where the target cell Physical Cell ID (PCI) reported from the wireless device, see step 9 in FIG. 6, is known in the source radio network node. Additional steps are needed in case the target cell PCI is not known in the source radio network node. The information received by the radio network node comprises:

1. An eNB receives information from a core network node, such as an MME, in several different messages, such as e.g. "S1 Setup response", "Initial Context setup", "UE Context modification" and/or "Handover request". The initial context setup message is indicated in step 3a in FIG. 6. In addition, the information element "Handover Restriction List" contains parts of the information. The information received from MME may contain:

List of served PLMN's.
List of served MME groups and MME codes.
Current PLMN serving the connected UE.
Equivalent PLMNs for the connected UE.
Forbidden TAs and LAs for the connected UE.
Forbidden RATs for the connected UE.
Subscriber profile ID (SPID) for the subscriber
  Note: Subscriber profile ID is used to convey absolute priorities of different E-UTRAN frequencies or inter-RAT frequencies, for prioritization of frequency layers the UE shall be served by in connected mode or camp on in idle mode. These absolute priorities may be common to all UEs or dedicated to a specific UE. If the UE receives dedicated priorities then these have priority over the common priorities available over system information.
QoS information for the bearers An eNB receives information from another eNB in messages such as a "X2 setup request", which is indicated in step 1 in FIG. 6, a "X2 setup response", which is indicated in step 2 in FIG. 6, an "eNb configuration update" and/or a "handover request" is indicated in step 11b in FIG. 6.

Network slicing is about creating logically separated partitions of the network, which may also be referred to as slices or network slices, addressing different business purposes. These network slices are logically separated to a degree that they can be regarded and managed as networks of their own.

Network slicing is a new concept that applies to both LTE Evolution and New 5G RAT, which herein is referred to as NX. The key driver for introducing network slicing is business expansion, i.e. improving the operator's ability to serve other industries, by offering connectivity services with different network characteristics, such as e.g. performance, security, robustness, and/or complexity.

The current main working assumption is that there will be one shared RAN infrastructure that will connect to several EPC instances, where one EPC instance relates to a network slice. As the EPC functions are being virtualized, it is assumed that an operator will instantiate a new CN when a new slice should be supported.

Network sharing, which is described in 3GPP TR 22.951 and 3GPP TS 23.251, is a way for operators to share the heavy deployment costs for mobile networks, especially in the roll-out phase. In the current mobile telephony marketplace, functionality that enables various forms of network sharing is becoming more and more important.

A network sharing architecture allows different core network operators to connect to a shared RAN. The operators do not only share the radio network elements, but may also share the radio resources themselves. In addition to this shared radio access network the operators may or may not have additional dedicated radio access networks.

The RAN sharing is based on the possibility for operators to share the same RAN and optionally the same spectrum by means of two standardized architectures, which are shown in FIG. 7. The first architecture is called Mobile Operator Core Network (MOCN) and consists of different participating operators which connect their CN infrastructure to a commonly shared RAN. In this case each participating operator can run CN-RAN procedures from its own managed RAN. In the MOCN configuration, the RAN routes the UE's initial access to the shared network to one of the available CN nodes. Supporting UEs shall inform the RAN of the chosen core network operator so that the RAN can route correctly.

A second architecture option is called Gateway Core Network (GWCN) and it consists of the shared RAN connecting to a single shared CN. Participating operators would therefore share the CN as well as the RAN.

The RAN may be managed by one of the participating operators or may be managed by a third party. It may also be possible that the CN infrastructure is managed by one of the participating operators or by a third party or it may be managed in part, i.e. for some nodes, by a third party and in part by the participating operator. Each participating operator has access to a set of resources both in the CN and in the RAN.

A RAN in a sliced network may be implemented with the following pre-requisites:

A RAN operator manages a number of eNBs which are comprised in the operators own transport network in the RAN.

The RAN operator, CN operators and other participating parties in the shared system have mutual Service Level Agreements (SLA).

The shared network supports a number of coexisting network slices, wherein each slice is served by part of the overall RAN/CN infrastructure. Each core network node, such as an MME, in the CN can handle one or several slices. Furthermore each cell of a RAN node, such as an eNB, can also handle one or several slices.

The aim of the network slicing is to provide a simple tool for cellular operators to introduce new services and features to different industries.

Due to the highly increased number of virtualized networks sharing the infrastructure of the communications network the capacity of the infrastructure might soon reach its limit. Furthermore, the increased number of parties, such as network operators and/or infrastructure owners, cooperating in the communications network, leads to an increased effort for coordinating different identifiers between the virtualized networks within the communications network in order to avoid wrongful routing of transmissions between the different network entities, such as network nodes and/or network slices. Such coordination is both time consuming and cost intensive for all parties involved.

Further, due to the highly increased number of network slices supported by each network, two cells and or RAN nodes supporting different networks, may support the same slices in equivalent networks. However, if the slice-IDs are not coordinated between the networks a wireless device performing a mobility procedure, such as a cell reselection to a slice which the wireless device supports and is currently connected to.

If the cell and/or the RAN node, to which the wireless device performs the reselection, does not support the slice for which the wireless device performs the reselection, a connection request from the wireless device may be denied by the RAN node although the RAN node supports a slice equivalent to the slice supported by the wireless device. The wireless device will retry to connect to the same cell or to another cell supporting the slice supported of the wireless device until the connection request is accepted. This may lead to unnecessary signaling in the network and may also mean that the wireless device is out-of-service for both traffic terminating at the wireless device and traffic originating from the wireless device. Another problem is that the wireless device may be camping on a cell without knowing that it will not get any service for a specific slice from that cell. This may happen if the wireless device doesn't trigger a normal tracking area update when entering the cell to camp on.

Figure 8:
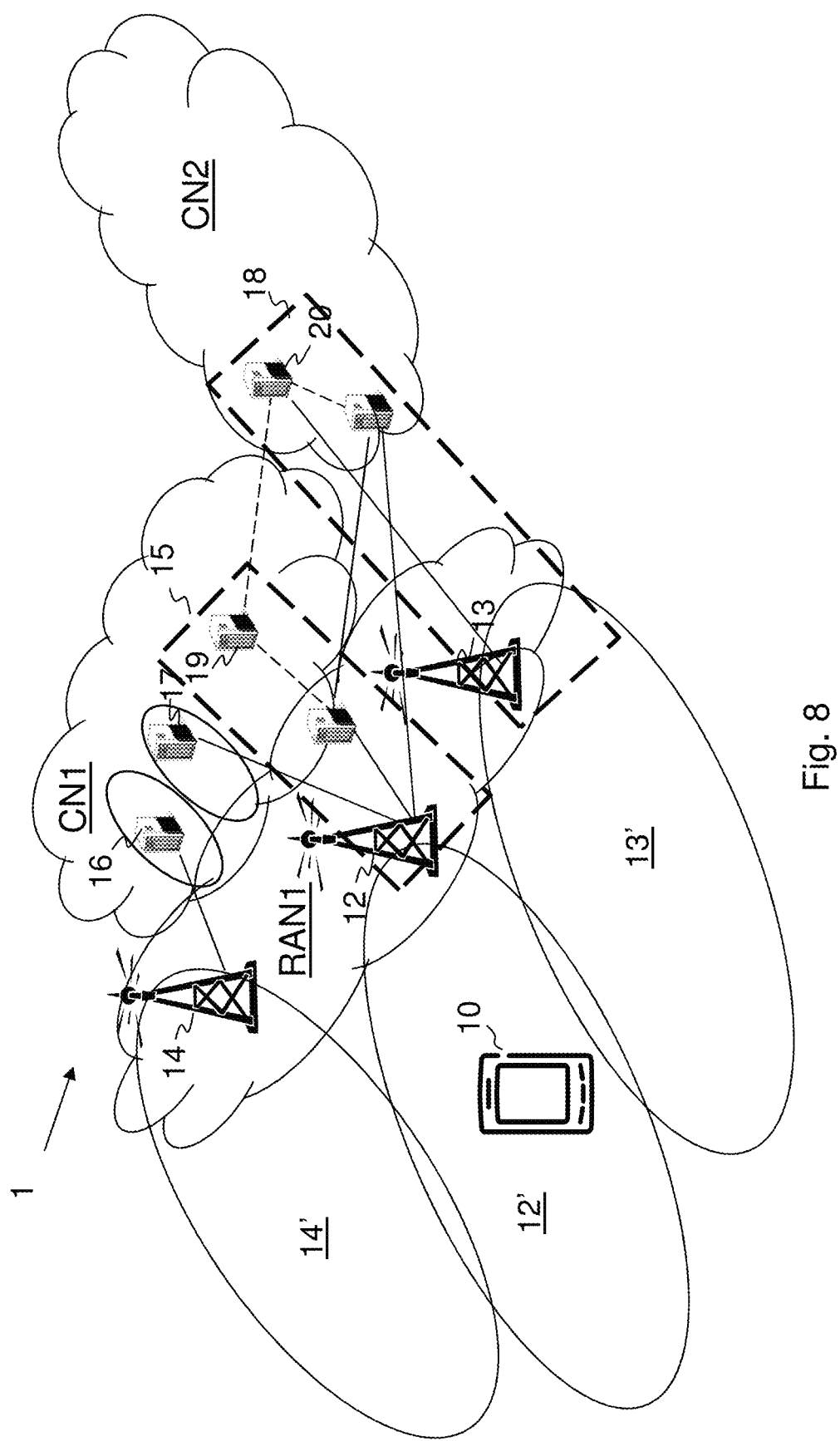
FIG. 8 is a schematic overview depicting a communication network according to embodiments herein.

Embodiments herein relate to communication networks in general. FIG. 8 is a schematic overview depicting a communication network 1. The communication network 1 comprises a RAN and a CN. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a User Equipment (UE) and/or a wireless terminals, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises set of radio network nodes, such as radio network nodes 12, 13, 14 each providing radio coverage over one or more geographical areas, such as a cell 12', 13', 14' of a radio access technology (RAT), such as LTE, UMTS, Wi-Fi or similar. The radio network node 12, 13 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 12, 13, 14 depending e.g. on the first radio access technology and terminology used. The radio network nodes 12, 13, 14 are comprised in a first radio access network (RAN1) of a first network.

Furthermore, the communication network 1 comprises a first core network (CN1) and a second core network (CN2). The radio network node 12 may communicate with both the CN1 and the CN2. The first network comprises the first core network CN1. The first network is a virtual network sliced into a number of network slices, the CN1 and/or the RAN1 may be a virtual network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a core network slice node or a RAN slice node. For example, a first network slice for e.g. MTC devices may comprise a first network slice node 16. A second network slice for e.g. MBB devices may comprise a second network slice node 17. Each network slice supports a set of functionalities out of a total set of functionalities in the communication network. E.g. the first network slice node 16 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MBB devices.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physically separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 16 supports the first set of functionalities out of the total set of functionalities in the first network of the communication network, which first set of functionalities belongs to the first network slice of the first network, and is separated from another set of functionalities out of the total set of functionalities in the first network.

A first network 15 comprises one or more first network nodes, such as first core network node 19 e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. The first network node 15 may further be a radio access network node such as the first radio network node 12.

A second network 18 comprises one or more second network nodes, such as second core network node 20 e.g. Radio SDN nodes, MMEs, S-GWs, SGSNs, or corresponding nodes in e.g. a 5G network or similar. The second network node may further be a radio access network node such as the first radio network node 13.

In one embodiment described herein, the wireless device is in Connected Mode and is camping on a first cell 12' of the first RAN node 12. The RAN node 12 which the wireless device is camping on may be referred to as a source RAN node. When the wireless device is in Connected Mode it has an established radio bearer and can exchange data with a source radio network node. When the wireless device moves in the communications network 1, it will continuously look for a more suitable cell to establish a radio bearer to. This mobility procedure is referred to as a handover.

Problems have been identified in relation to connected mode mobility, such handover, release with redirection and/or RRC-connection re-establishment, for the wireless device 10 supporting network slicing, especially in cases when there exist geographically and/or frequency layer limited network slices i.e. network slices which are supported only in parts of the RAN.

In order to select a handover target radio network node in the same frequency layer or other frequency layers, the RAN and/or the radio network node that serves the wireless device 10 which is connected to a specific network slice needs to know in which radio network nodes and/or cells in the network the slice is supported. Otherwise, the wireless device 10 can easily loose connection towards the current slice if the RAN and/or the radio network node hands over the wireless device 10 to a cell of the radio network node which does not support the current slice(s) for the wireless device 10.

Figure 9:
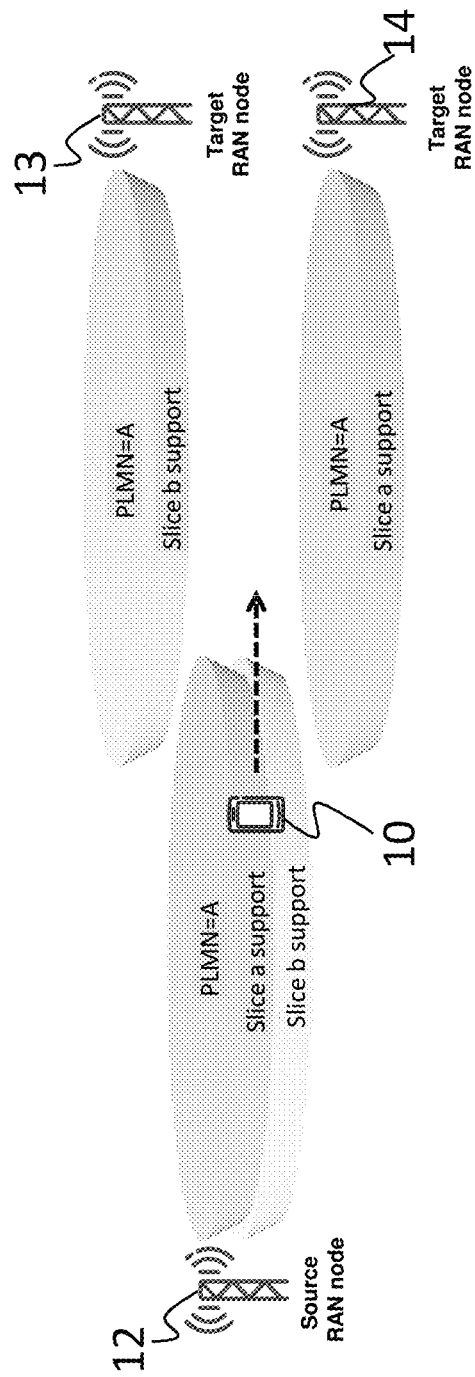
FIG. 9 is a schematic overview depicting a RAN configuration for slicing.

For example, if we consider a radio network configuration according to FIG. 9, where the cells in the source radio network node 12 is supporting PLMN=A; slices=a and b, cells in a first target radio network node 13 are supporting PLMN=A; slice=b, and finally cells in a second target radio network node 14 are supporting PLMN=A; slice=a, and the wireless device 10 initially is connected to slice a through the source radio network node 12. In case the RAN and/or the radio network node attempts to handover the wireless device 10 to cells in the target radio network node that do not support slice a, such as e.g. the first target radio network node 13, the handover may be allowed. However, the connection to slice a will be lost as the cell in the first target radio network node 13 doesn't have any network connection towards a core network node that supports slice a. This behavior is problematic for several reasons. It may result in a plurality of failed handover attempts or loss of connection to a specific slice. This may lead to unnecessary signaling in the communications network and may further lead to the wireless device 10 being out-of-service for both traffic terminating at or originating from the wireless device 10. Another problem is that the wireless device 10 may be served by a cell without knowing that it will not get any service for a specific slice. This may e.g. happen if the wireless device 10 doesn't trigger a normal tracking area update when entering a cell to camp on.

Embodiments herein introduce an efficient manner of reducing the risk of erroneous and rejected connection requests for a wireless device 10 which is performing mobility procedures in a communications network. By indicating to the wireless device 10 which cells support the network slice supported by the wireless device 10, the wireless device 10 can take this information into account when performing the mobility procedures, such as cell selection and/or reselection, in order to find a cell to camp on. Thereby, unnecessary signaling from the wireless device 10 to cells and/or radio network nodes which do not support the network slice of the wireless device 10 is minimized, which increases the performance of the communications network. Furthermore, the risk of the wireless device 10 camping on an erroneous cell is reduced which improves the reliability of the communications network.

Embodiments herein therefore relate to a method for handling mobility of the wireless device 10 in the communication network 1.

In the embodiments herein, a source radio network node 12 receives information about slice support in other radio network nodes. The source radio network node 12 may further also receive information about slice equivalence between different PLMNs from a core network node 13, such as an MME. In current networks information about equivalent networks, such as PLMNs, which may also be referred to as PLMN equivalence information, can be provided to a wireless device 10 when the wireless device 10 attaches to the CN. This information may be used by the wireless device 10 for suitability evaluation of cells during cell selection and reselection in idle mode. Each radio network node also broadcasts supported PLMN for each cell, i.e. the PLMNs which the radio network node supports S1 connectivity to. In connected mode the source radio network node 12 may receive similar information from the CN node in order to assist the source radio network node 12 in suitable target selection for e.g. a handover.

The embodiments herein enhance the current signaling by providing slice support equivalence information for each slice supported by each PLMN.

In a first embodiment herein, explicit slice support information may be provided. The explicit slice support information may be structured as a slice id list per PLMN. In a second embodiment herein, implicit slice support information may be provided. The implicit slice support information may be coded into the Tracking Area Identity (TAI) and further providing the source radio network node 12 with a list of supported TAIs, such as e.g. allowed and/or forbidden TAIs. Thereby the source radio network node 12 is able to determine which the slices supported for the wireless device 10. If the same slice IDs are supported from different cells these cells will have the same TAI or at least be part of the supported TAI list.

The core network node 19 may provide information of the current slice(s) for the wireless device 10 to the radio network node 12, and in addition it may provide information about any equivalent slices for the current slice(s) for the wireless device 10. In this way the core network node 19, such as an MME, can control and provide additional input to the radio network node selection of target cells for handover decisions.

In the embodiments herein, when the source radio network node 12 has information about equivalent PLMNs and slices, and which radio network node and/or cell support of PLMNs and slices, the source radio network node 12 will also have information about the slice support per cell and neighboring cells. This will enable the source radio network node 12 to perform appropriate target cell selection for handover in order to keep the wireless device connected to the slice(s) used.

Figure 10:
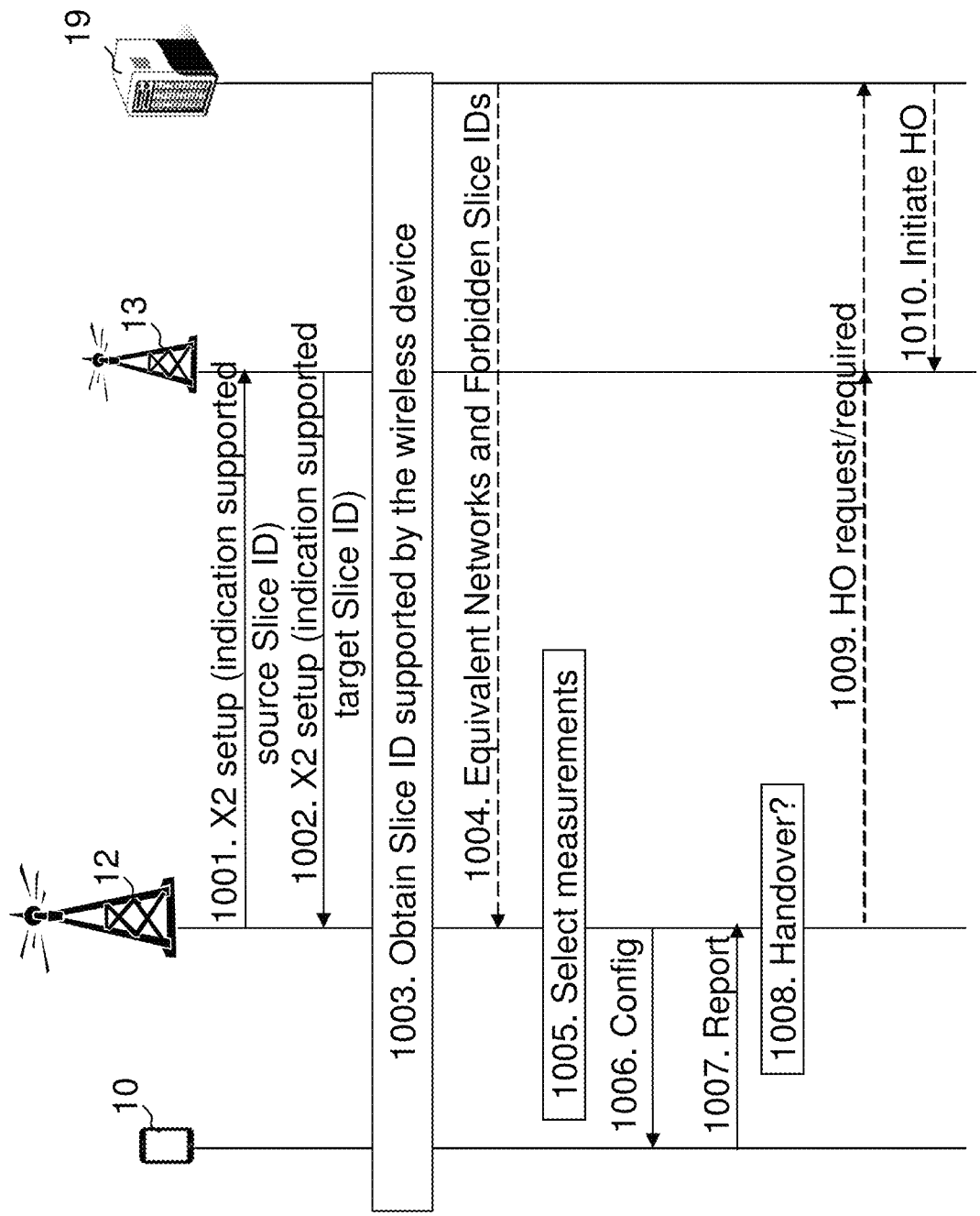
FIG. 10 is a signaling diagram depicting an overview of mobility procedures according to a embodiments herein.
Figure 11:
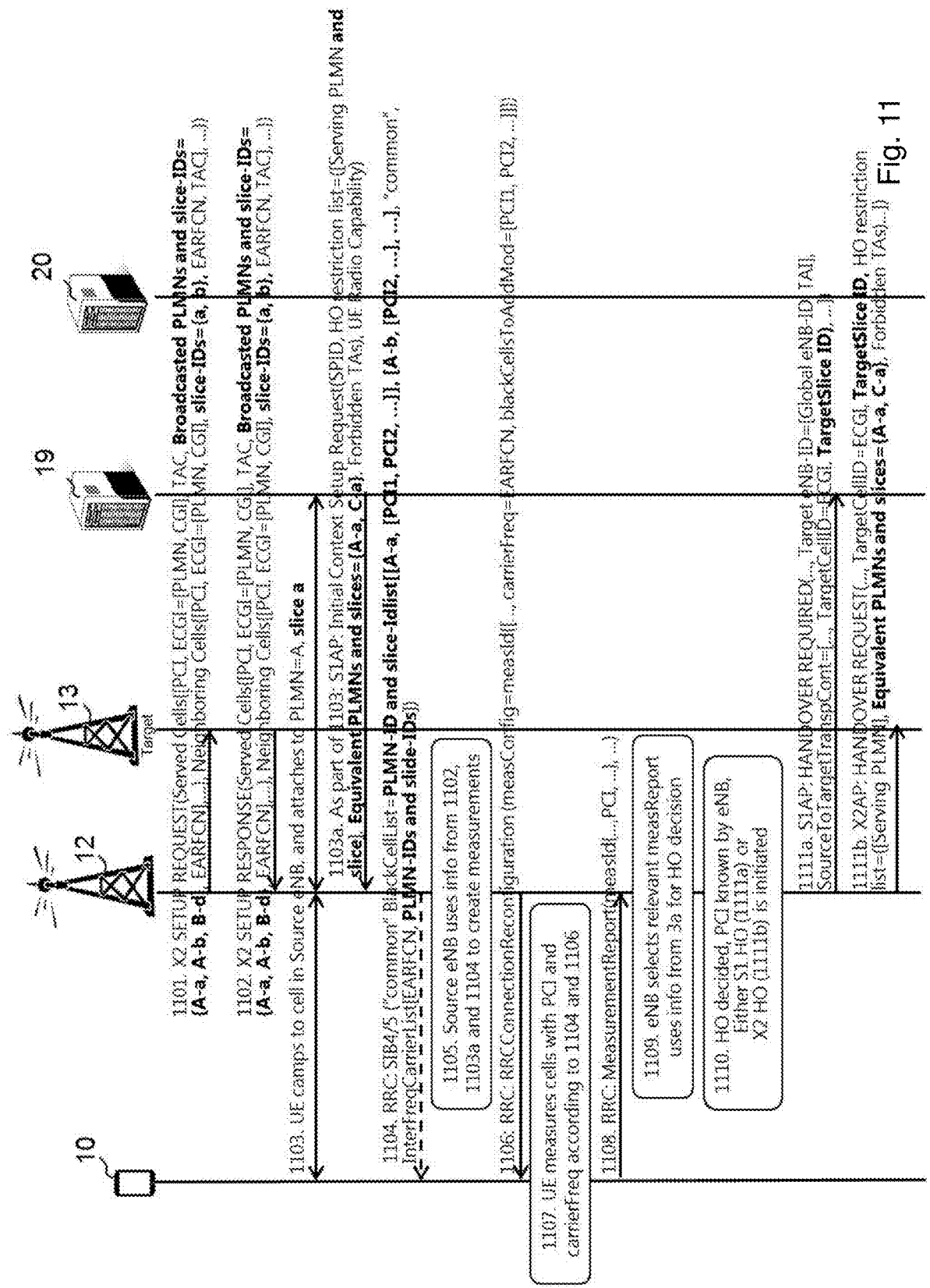
FIG. 11 is a signaling diagram depicting a mobility procedure according to a first aspect of embodiments herein.
Figure 12:
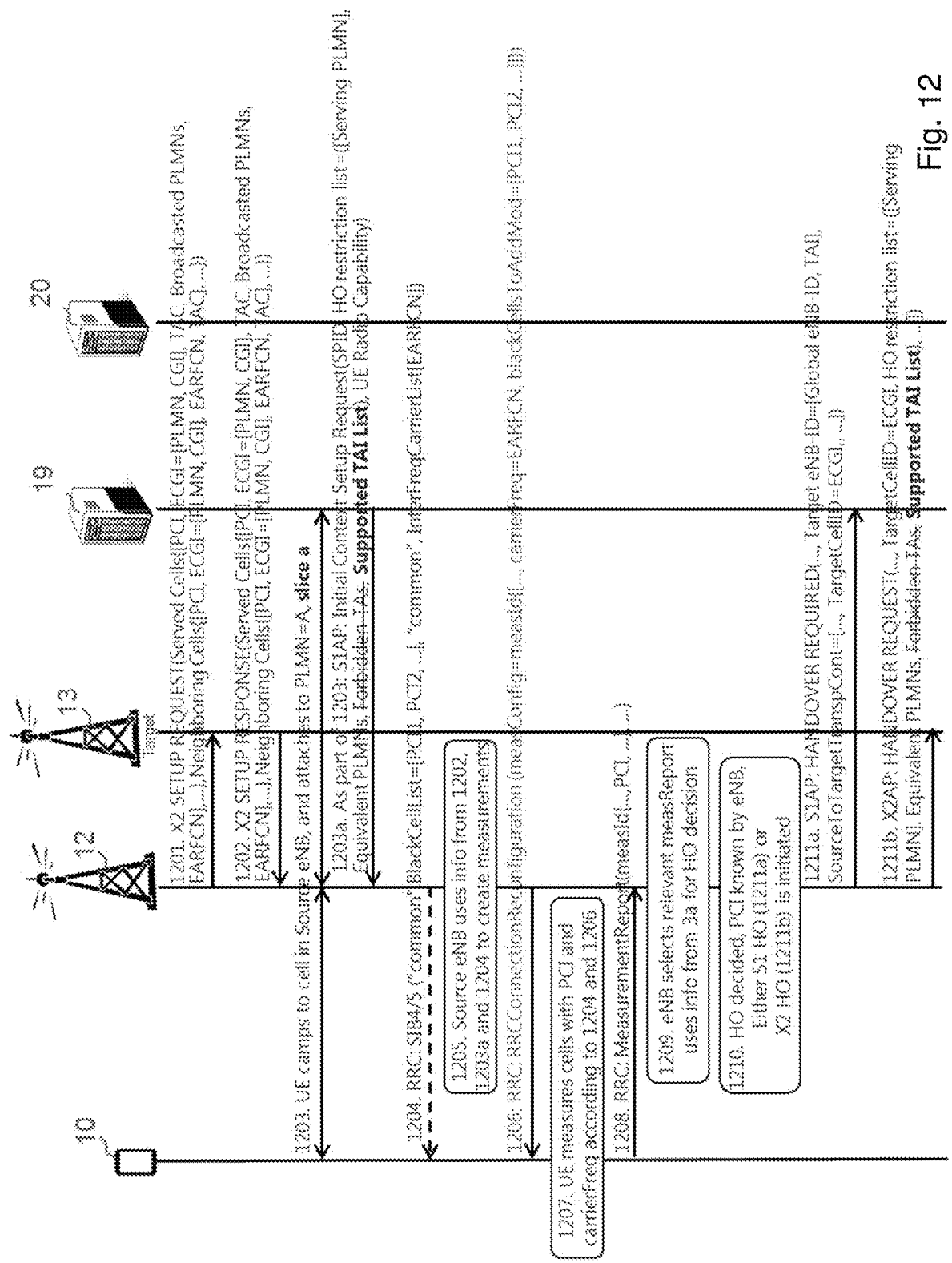
FIG. 12 is a signaling diagram depicting a mobility procedure according to a second aspect of embodiments herein.

FIGS. 10 to 12 below disclose examples of the signaling in the communication network according to embodiments herein. FIG. 11 shows a scenario in which explicit slice support information is used while FIG. 12 shows a scenario in which implicit slice support information is used.

Action 1001:

The first radio network node 12, which may also be referred to as a source radio network node, transmits a message comprising information indicating one or more slice identities supported by the first radio network node 12, to a second radio network node 13 in the communication network. The second radio network node 13 may also be referred to as a target radio network node. According to a first embodiment herein, the information in the transmitted message comprises explicit values of supported one or more networks and one or more slice identities. This first embodiment is disclosed in detail in FIG. 11. According to a second embodiment herein, the information comprised in the message implicitly indicates the slice identities supported by the first radio network node 12. In this second embodiment the information in the transmitted message comprises values of supported one or more networks and one or more tracking area codes, cell global identities, or cell identities. This second embodiment is disclosed in detail in FIG. 12. Action 1001 coincides with actions 1101 in FIG. 11 and action 1201 in FIG. 12.

Action 1002:

The first radio network node 12 receives a message comprising information indicating one or more slice identities supported by the second radio network node 12, from the second radio network node 13. Thereby, the first radio network node 12 will have information regarding the networks and slices supported by the second radio network node 13. The first radio network node 12 uses the information in order to determine if a handover to the second node 13 is possible. According to a first embodiment herein, the information in the received response message comprises explicit values of supported one or more networks and one or more slice identities. This first embodiment is disclosed in detail in FIG. 11. According to a second embodiment herein, the information comprised in the message implicitly indicates the slice identities supported by the first radio network node 12. In this second embodiment the information in the received response message comprises values of supported one or more networks and one or more tracking area codes, cell group identities, or cell identities. This second embodiment is disclosed in detail in FIG. 12. Action 1002 is similar to action 1102 in FIG. 11 and action 1202 in FIG. 12.

Action 1003:

The first radio network node 12 obtains a support indication indicating the slice ID the wireless device 10 supports. This indication is obtained during a connection setup of the wireless device 10 to the network slice of the first radio network node 12. During the connection setup the wireless device may camp on a cell in the first radio network node 12 and attaches to a PLMN and a slice supported by the cell and by the core network node 19. The first radio network node 12 may obtain the indication from the wireless device 10 and/or from the core network node 19. This action 1003 is similar to action 1103 in FIG. 11 and action 1203 in FIG. 12. According to a further embodiment the slice ID may be obtained during handover from another radio network node through X2AP: Handover Request, see Action 1111*b*, parameter "Target slice ID", and in Action 1211*b* "UE context information" (not shown in the figure). The UE context information implicitly provides the UE context ID on the core network node, where the sliceID is known in the core network node 19 to wireless device 10 context.

Action 1004:

As a response to the attachment of the wireless device 10, the core network node 19 sends information to the first radio network node 12, which information indicates equivalent networks and slices, and slices allowed or not allowed to use for the wireless device 10. The information may e.g. be transmitted in an S1AP Initial Context Setup Request message comprising an indication of the network which the wireless device is currently attached to, which may also be referred to as a serving PLMN, available equivalent PLMNs for the network which the wireless device is currently attached to and an indication of the slices in the equivalent PLMNs, which slice is equivalent to the slice which the wireless device 10 is currently attached to at the first radio network node 12.

According to a further embodiment herein, the slice ID is obtained during handover from another radio network node through X2AP: Handover Request, see Action 1111*b*, parameter "Eq PLMN and slices" which explicitly provides the equivalent slice, and Action 1211*b*, parameter "Supported TAI list" which implicitly provides the slice equivalent.

This information may be added as an equivalent PLMN and equivalent slice-ID list, which herein may also be referred to as a "PLMN-eq and slice-eq list". The corresponding networks and slices for the network slice supporting the wireless device 10 may be indicated as following in the message <PLMN-ID><slice-ID>. This action is similar to action 1103*a* in FIG. 11 for the embodiment where the slice ID is explicitly disclosed in the signaling and similar to action 1203*a* in FIG. 12 for the embodiment where the slice ID is implicitly disclosed in the signaling.

Action 1005:

In order to determine the mobility procedure to be performed, the first radio network node 12 may select measurements for making a mobility decision based on the information in the received response message and the obtained support indication. The selecting may further be based on information received from the core network node 19 or other radio network node, which information indicates equivalent networks and slices, and slices allowed or not allowed to use for the wireless device 10. This action is similar to action 1105 in FIG. 11 and action 1205 in FIG. 12.

Action 1006:

When the first radio network node 12 has selected the measurements, it may send a configuration message to the wireless device 10 for activating one or more measurements on a frequency band of the second radio network node 13. The configuration message may comprise information about which frequencies of the second radio network node 13 the wireless device 10 shall perform measurements on and may also indicate which cells the wireless device shall not trigger an event report for, i.e. cells that are blacklisted. This action corresponds to action 1106 in FIGS. 11 and 1206 in FIG. 12.

Action 1007:

The first radio network node 12 receives a measurement report from the wireless device 10 based on the measurement configuration sent to the wireless device 10 in action 1106. The measurement report may indicate to the first radio network node 13 that a cell of the second radio network node 12 identified by e.g. a PCI fulfills the reporting criteria, i.e. is a cell suitable to perform a handover to. This action corresponds to action 1108 in FIGS. 11 and 1208 in FIG. 12.

Action 1008:

The first radio network node 12 decides to perform mobility procedure to one or more slices of the second radio network node 13 based on the one or more measurements received from the wireless device 10 in action 1007. This action 1007 corresponds to the actions 1109 and 1110 in FIG. 11 and to actions 1209 and 1210 in FIG. 12.

Action 1009:

The first radio network node 12 transmits a handover required to the core network node 19 in order to initiate a handover to the second radio network node 13, which handover required comprises an indication of the decided one or more slices supported by the second radio network node 13 to perform mobility procedure to. This embodiment of action 1009 is similar to actions 1111*a* in FIGS. 11 and 1211*a* in FIG. 12. The first radio network node 12 may however, as an alternative to the handover required, transmit a handover request to the second radio network node 13 in order to initiate a handover to the second radio network node 13, which handover request comprises an indication of the decided one or more slices supported by the second radio network node 15 to perform mobility procedure to. This message may also contain an indication of the network which the wireless device is currently attached to, which may also be referred to as a serving PLMN, available equivalent PLMNs for the network which the wireless device is currently attached to and an indication of the slices in the equivalent PLMNs, which slice is equivalent to the slice which the wireless device 10 is attached to at the radio network node 13. This embodiment of action 1009 is similar to actions 1111*b* in FIGS. 11 and 1211*b* in FIG. 12.

The decided slices of the second radio network node 13 may be explicitly indicated as further discussed in FIG. 11 or implicitly disclosed as further discussed in FIG. 12.

Action 1010:

When the first radio network node 12 has transmitted a handover required to the core network node 19, the core network node 19 may initiate a mobility procedure of the wireless device 10 to the second radio network node 13 by taking the one or more slices supported by the second radio network node 13 into account. The mobility procedure may be initiated by sending an initiating message to the second radio network node 13, which message comprises information regarding the one or more slices supported by the second radio network node 13 which the first radio network node 12 has decided to perform the mobility procedure to. This message may also contain an indication of the network which the wireless device is currently attached to, which may also be referred to as a serving PLMN, available equivalent PLMNs for the network which the wireless device is currently attached to and an indication of the slices in the equivalent PLMNs, which slice is equivalent to the slice which the wireless device 10 is attached to at the radio network node 13

The problem mentioned earlier, where the first radio network node 12 doesn't know if the target cell, i.e. the second radio network node 13, supports the slice to which the wireless device 10 is currently connected to is solved, since the first radio network node 12 receives an indication of equivalent networks and slices, and slices allowed or not allowed to use for the wireless device 10 in other radio network nodes in action 1004. The first radio network node 12 matches the equivalent networks and slices, and slices allowed or not allowed to use for the wireless device 10 against the target cell's PLMN-ID and the slice-ID received from the second radio network node 13 in action 1007. Thereby, the first radio network node 12 may determine if the slice is supported by the target cell or not, in order to ensure that connectivity to a specific network slice is maintained during mobility procedures. Another advantage of this invention is that slice ID coordination between networks can be minimized. The only configuration needed is slice ID mapping between the network which the wireless device is currently registered to and equivalent networks to the registered network. This coordination can be treated as minimum as this mapping only has to be implemented in the registered network.

FIG. 11 discloses the signaling in the network when the slices supported are explicitly disclosed in the information. The identifiers introduced in this embodiment are indicated with bold font. The preconditions to the signaling sequence shown in FIG. 11 are as follows. The source radio network node 12 supports the slices A-a, A-b, B-d, which are indicated as a combination of PLMN-ID and slice ID. The target radio network node 13 supports the same slices as the source radio network node 12. In addition, there may exist further radio network nodes that don't support for example slice A-a, these are however not shown in FIG. 11. The wireless device 10 is associated with slice A-a for example via a local configuration on the wireless device 10 side, e.g. the wireless device 10 may be configured with information about this slice.

Action 1101:

The source radio network node 12 sets up an X2 connection to the target radio network node 13 and indicates broadcasted and supported PLMNs and the supported slice-IDs for each PLMN and served cell. It may optionally also indicate the same for neighboring cells. In the scenario disclosed herein, the source radio network node 12 includes information about slices A-a, A-b, B-d.

The X2 setup is typically done at radio network node deployment but may be also done just before a handover is performed.

Action 1102:

The target radio network node 13 responds with the same information as the source radio network node 12 sent in action 1101. When the source radio network node 12 has received the information from the target radio network node 13, it will have information about supported PLMN(s) and PLMN associated slices per served cell in the radio network nodes 13. This may be performed with a plurality of radio network nodes, in order to have information about supported PLMN(s) and PLMN associated slices per served cell in all the radio network nodes which the source radio network node 12 has set up X2 connections with. This information may be stored in a data base and later used to look up an E-UTRAN Cell Global Identifier (ECGI) and/or PLMN+ Slice support of a measurement reported cell. The data base may e.g. be comprised in the source radio network node 12. In the scenario disclosed herein, the target radio network node 13 informs the source radio network node 12 that the target radio network node 13 supports slices A-a, A-b, B-d.

Action 1103:

The wireless device 10 sets up an RRC connection to the source radio network node 12 and a NAS signaling to a core network nod 19, in order to either attach to slice=a, which is supported by PLMN=A, or a NAS service request for NAS signaling to slice=a. The RRC connection may also be setup due to an S1 Handover.

Action 1103a:

The core network node 19 responds to the source radio network node 12 with a S1AP INITIAL CONTEXT SETUP REQUEST message. The message comprises information regarding which slices that are equivalent between PLMN(s). In the scenario disclosed herein, PLMN=A, which supports slice=a, and PLMN=C, which also supports slice=a, are slice equivalents for slice=a. Based on this information the source radio network node 12 knows that the wireless device 10 can be handed over to any cell of the target radio network node supporting either slice A-a or slice C-a. The message may further comprise forbidden Tracking Areas (TAs). The source radio network node 12 may further receive dedicated frequency prio comprised in the message, to be used for target selection. If the dedicated frequency prio is not comprised in the message the source radio network node 12 will typically use the frequency prio broadcasted in system information.

In case the RRC Connection is set up due to a S1 handover mentioned above. The core network node 19 will be initiated with a HANDOVER REQUEST message which comprises the same information set regarding supported networks and slices.

Action 1104:

The source radio network node 12 may transmit the dedicated information about frequency prio to be used in idle mode to the wireless device 10. This information may comprise a list of PLMN-IDs and slice-IDs supported by each cell indicated by a Physical Cell Identity (PCI).

Action 1105:

The source radio network node 12 uses the information about the capabilities of the wireless device 10 and which cells that support slice=a and uses that to determine valid target cells in case a handover to a target cell is required, due to e.g. changing channel conditions.

Action 1106:

The source radio network node 12 sends a measurement configuration informing the wireless device 10 which frequencies to monitor and which cell(s), if any, the wireless device 10 should not trigger an event report for, even though the reporting criteria have been fulfilled. This cell(s) may be referred to as blacklisted PCI. The selection of information included in the measurement configuration to the wireless device 10 may be based on both equivalent slice support information received from the core network node 19, and information about slice support received from other radio network nodes, such as the target radio network node 13.

Action 1107:

The wireless device 10 performs the measurement on the cells with PCI and frequency as indicated in action 1104 and action 1106.

Action 1108:

The wireless device 10 sends a measurement report to the source radio network node 12, which report indicates that a cell, which is identified by the PCI, fulfills the reporting criteria.

Action 1109:

The source radio network node 12 translates the frequency+PCI to an ECGI using a PCI to ECGI translation database. The database may e.g. be stored in the source radio network node 12. The source radio network node 12 may further retrieve stored information about PLMN and slice support of the reported cell based on the ECGI and uses the retrieved information to decide if a handover should be performed. For example, if the cell reported by the wireless device 10 supports either slice A-a or C-a, the handover may be performed. If not, the source radio network node 12 may wait for a measurement report for a cell that supports either of these slices.

Action 1110:

The source radio network node 12 initiates either a S1 or X2 handover and provides target slice=A-a to target radio network node 13. The PLMN-ID for the slices already exists and is included in ECGI. The S1 handover may be initiated by sending a S1AP HANDOVER REQUIRED message to the core network node 19, which message comprises the target slice ID of the target radio network node 13. This is indicated by action 1111a in FIG. 11. The X2 handover may be initiated by sending a X2AP HANDOVER REQUEST message to the target radio network node 13, which message comprises information about equivalent PLMNs and slices. In case the core network node 19 is configured to handle multiple slices, the HANDOVER REQUEST message may further comprise the target slice ID. This is indicated by action 1111b in FIG. 11.

FIG. 12 discloses the signaling in the network when the slices supported are implicitly disclosed in the information. The identifiers introduced in this embodiment are indicated with bold font. The preconditions to the signaling sequence shown in FIG. 12 are as follows. The source radio network node 12 and different target radio network nodes support different slices. In the scenario disclosed herein no explicit slice support information is signaled, instead the slice support indication is comprised in the Tracking Area (TA) information. Both the source radio network node 12 and the target radio network node 13 support cells with the same TAI, indicating that these cells support the same slices. In addition, there may exist other radio network nodes that don't support the same TAI, these are however not shown in FIG. 12. The wireless device 10 is associated with slice A-a for example via local configuration on the wireless device 10 side, the wireless device 10 may e.g. be configured with information about this slice.

The signaling sequence in FIG. 12 shows a scenario in which implicit slice support information is given by providing supported TAI.

Action 1201:

The source radio network node 12 sets up an X2 connection to the target radio network node 13 and indicates broadcasted and supported PLMN's. The source radio network node 12 further broadcasts Tracking Area Codes (TAC) for each cell and by using supported TAI information the wireless device 10 and the source radio network node 12 can select the appropriate cells which support the slice of the wireless device 10. The X2 setup is typically done at radio network node deployment but may be also done just before a handover is performed.

Action 1202:

The target radio network node 13 responds with the same information. Thereby, the source radio network node 12 will have information about supported PLMN(s) and TAC per served cell in the nodes which it have X2 connections to. This information may be stored in a data base and can later be used to look up ECGI and PLMN+Slice support of a measurement reported cell. The data base may e.g. be comprised in the source radio network node 12.

Action 1203:

The wireless device 10 sets up an RRC connection to the source radio network node 12 and a NAS signaling to a core network nod 19, in order to either attach to slice=a, which is supported by PLMN=A, or a NAS service request for NAS signaling to slice=a. The RRC connection may also be setup due to an S1 Handover.

Action 1203*a*:

The core network node 19 responds to the source radio network node 12 with a S1AP INITIAL CONTEXT SETUP REQUEST message. The message comprises information regarding which slices that are equivalent between PLMN(s). However, the slices are in this embodiment implicitly indicated via a Supported TAI list information which replaces the Forbidden TAs indicated in signaling known from prior art. In the scenario disclosed herein, PLMN=A, which supports slice=a, and PLMN=C, which also supports slice=a, are slice equivalent PLMNs for slice=a. This is indicated by including TAIs for both PLMNs in the Supported TAI list. The message may further comprise forbidden Tracking Areas (TAs). The source radio network node 12 may further receive dedicated frequency prio comprised in the message, to be used for target selection. If the dedicated frequency prio is not comprised in the message the source radio network node 12 will typically use the frequency prio broadcasted in system information.

In case the RRC Connection is set up due to a S1 handover mentioned above. The core network node 19 will be initiated with a HANDOVER REQUEST message which comprises the same information set regarding supported networks and slices.

Action 1204:

The source radio network node 12 may transmit the dedicated information about frequency prio to be used in idle mode to the wireless device 10. This information may comprise a list of PLMN-IDs and slice-IDs supported by each cell indicated by a Physical Cell Identity (PCI).

Action 1205:

The source radio network node 12 uses the information about the capabilities of the wireless device 10 and which cells that support slice=a and uses that to determine valid target cells in case a handover to a target cell is required, due to e.g. changing channel conditions.

Action 1206:

The source radio network node 12 sends a measurement configuration informing the wireless device 10 which frequencies to monitor and which cell(s), if any, the wireless device 10 should not trigger an event report for, even though the reporting criteria have been fulfilled. This cell(s) may be referred to as blacklisted PCI. The selection of information included in the measurement configuration to the wireless device 10 may be based on both equivalent slice support information received from the core network node 19, and information about slice support received from other radio network nodes, such as the target radio network node 13.

Action 1207:

The wireless device 10 performs the measurement on the cells with PCI and frequency as indicated in action 1204 and action 1206.

Action 1208:

The wireless device 10 sends a measurement report to the source radio network node 12, which report indicates that a cell, which is identified by the PCI, fulfills the reporting criteria.

Action 1209:

The source radio network node 12 translates the frequency+PCI to an ECGI using a PCI to ECGI translation database. The database may e.g. be stored in the source radio network node 12. The source radio network node 12 may further retrieve stored information about PLMN and slice support, i.e. the TAI, of the reported cell by using the ECGI and uses the retrieved information to decide if a handover should be performed. For example, if the cell reported by the wireless device 10 belongs to any TA in the Supported TAI list, the handover may be performed. If the reported cell does not belong to a TA in the Supported TAI list the source radio network node 12 may wait for a measurement report for a cell that belongs to any such TA.

Action 1210:

The source radio network node 12 initiates either a S1 or X2 handover and provides target slice=A-a to target radio network node 13. The PLMN-ID for the slices already known and is included in ECGI. The S1 handover may be initiated by sending a S1AP HANDOVER REQUIRED message to the core network node 19, which message comprises the target ID with radio network node ID, also referred to as eNB-ID and TAI of the target radio network node 13. The core network node 19 may derive the target PLMN-ID+slice ID by using the target eNB-ID and TAI (=PLMN-ID+TAC) This is indicated by action 1211*a* in FIG. 12. The X2 handover may be initiated by sending a X2AP HANDOVER REQUEST message to the target radio network node 13, which message comprises information about equivalent PLMNs and slices, the slices are implicitly indicated in the message by including the Supported TAI List in the HANDOVER REQUEST. This is indicated by action 1211*b* in FIG. 12.

Figure 13:
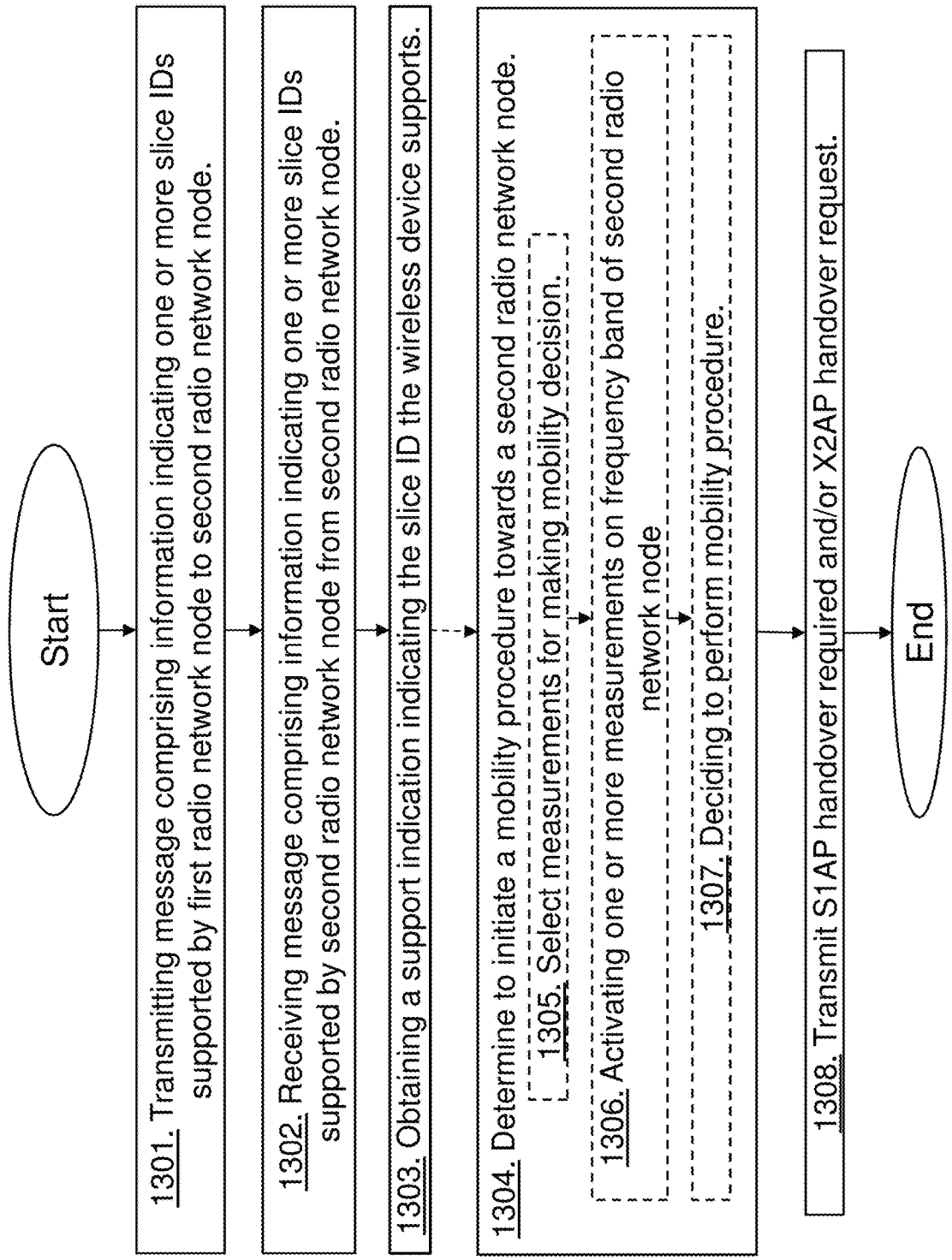
FIG. 13 is a schematic flowchart depicting a method performed by a first radio network node according to embodiments herein.

The method actions performed by the first radio network node 10, for handling a mobility procedure of a wireless device 10 in a communication network 1 according to embodiments herein will now be described with reference to a flowchart depicted in FIG. 13. The actions do not have to be taken in the order stated below, but may be taken in any suitable order. Actions performed in some embodiments only are marked with dashed boxes. The communication network 1 comprises partitioned sets of functionalities. Each set of functionalities belongs to a network slice. Each set of functionalities is separated from other sets of functionalities out of a total set of functionalities in the communication network. A first set of functionalities belongs to a first network slice supporting the wireless device 10.

Action 1301:

The first radio network node 12 transmits a message comprising information indicating one or more slice identities supported by the first radio network node 12, to a second radio network node 13 in the communication network. The message may be an X2 SETUP REQUEST which comprises an explicit or an implicit indication of the networks and slices supported by the first network node 12. According to one embodiment herein, the information in the transmitted message may comprise explicit values of one or more networks and one or more slice identities supported by the first radio network node 12.

The explicit values may e.g. be indicated in a list which comprises an entry for each network identifier. For each network identifier the message may comprise a corresponding list of network slice identifiers. This may be indicated in the message in the following form:

<PLMN-ID=A><Slice-ID=(a, b, d)><PLMN-ID=C><Sliced D=(i, j, k)> . . . .

The list may however also comprise an entry for each combination of equivalent network identifier and equivalent network slice identifier. This may be indicated in the message in the following form:

<PLMN-ID=A><Slice-ID=a><PLMN-ID=A><Slice-ID=b> . . . <PLMN-ID=C><Slice-ID=i><PLMN-ID=C><Slice-ID=j> . . . .

In a second embodiment the information in the transmitted message comprises values of supported one or more networks and one or more tracking area codes, cell global identities, or cell identities. These values implicitly indicate the the networks and slices supported by the first network node 12.

This action 1301 is similar to the action 1001 described above in relation to FIG. 10, action 1101 described above in relation to FIG. 11 and action 1201 described above in relation to FIG. 12.

Action 1302:

The first radio network node 12 receives a response message comprising information indicating one or more slice identities supported by the second radio network node 13 from the second radio network node 13 in the communication network.

The information in the received response message may comprise explicit values of one or more networks and one or more slice identities supported by the second radio network node 13.

The information in the received response message may comprise values of supported one or more networks and one or more tracking area codes, cell group identities, or cell identities. Thereby implicitly disclosing the networks and slices supported by the second network node 13.

The message may be a broadcasted message comprising system information, which system information comprises information regarding the networks and network slices supported by the RAN node 12, 13, i.e. each RAN node will indicate the networks and network slices it supports.

This action 1302 is similar to the action 1002 described above in relation to FIG. 10, action 1102 described above in relation to FIG. 11 and action 1202 described above in relation to FIG. 12.

Action 1303:

The first radio network node 12 obtains, during a connection setup of the wireless device 10 to the network slice, a support indication indicating the slice ID the wireless device 10 supports. The support indication may be obtained from the wireless device 10 and/or the core network node 19.

This action 1303 is similar to the action 1003 described above in relation to FIG. 10, action 1103 described above in relation to FIG. 11 and action 1203 described above in relation to FIG. 12.

Action 1304:

The first network node 12 may determine 1304 to initiate a mobility procedure towards the second radio network node 13 taking the information in the received response message in action 1301 and the obtained support indication in action 1303 into account.

This action 1304 is similar to the action 1005-1008 described above in relation to FIG. 10, action 1105-1110 described above in relation to FIG. 11 and action 1205-1210 described above in relation to FIG. 12.

Action 1305: The determining to initiate the mobility procedure may comprise selecting measurements for making a mobility decision based on the information in the received response message and the obtained support indication.

The selecting may further be based on information received from the core network node 19 or other radio network node, which information indicates equivalent networks and slices, and slices allowed or not allowed to use for the wireless device 10.

The information may further indicate a frequency priority order used when determining to initiate the mobility procedure.

This action 1305 is similar to the action 1005 described above in relation to FIG. 10, action 1105 described above in relation to FIG. 11 and action 1205 described above in relation to FIG. 12.

Action 1306:

The determining to initiate the mobility procedure may further comprise activating one or more measurements on a frequency band of the second radio network node 13, in order to determine to initiate the mobility procedure. These measurements may be activated by sending a RRCConnectionReconfiguration message to the wireless device 10, which message may comprise a measurement configuration indicating to the wireless device 10 which frequencies to measure on, which may also be referred to as being monitored, and which cells the wireless device shall not trigger an event report for even if the reporting criteria has been fulfilled. The frequencies may be indicated using an E-UTRA Absolute Radio Frequency Channel Number (EARFCN) and the cells may be indicated in a list comprising the blacklisted cells identified by a PCI, which list may also be referred to as a blackCellList.

This action 1306 is similar to the action 1006 described above in relation to FIG. 10, action 1106 described above in relation to FIG. 11 and action 1206 described above in relation to FIG. 12.

Action 1307:

The determining to initiate the mobility procedure may further comprise deciding to perform mobility procedure to one or more slices of the second radio network node 13 based on the one or more measurements activated in action 1306. The first radio network node 12 may decide to perform mobility procedure to one or more slices of the second radio network node 13 based on a measurement report received from the wireless device 10. This action 1307 is similar to the action 1008 described above in relation to FIG. 10, action 1109 and 1110 described above in relation to FIG. 11 and action 1209 and 1210 described above in relation to FIG. 12.

Action 1308:

The first radio network node 12 may further transmit a handover required to the core network node 19 or a handover request to the second radio network node 13, which handover required and/or handover request comprises an indication of the decided one or more slices supported by the second radio network node 13. In one embodiment herein, the indication may explicitly indicate the supported slices by comprising explicit values of one or more networks and one or more slice identities. In a second embodiment herein the indication may however also implicitly disclose the supported slices by comprising values of supported one or more networks and one or more tracking area codes, cell group identities, or cell identities, which allows the receiving node to identify the slice.

The handover request may further comprise information, which information indicates equivalent networks and slices, and slices allowed or not allowed to use for the wireless device 10.

The information may further indicate a frequency priority order used when determining to initiate the mobility procedure.

This action is similar to actions 1009 in FIG. 10, actions 1111a and 1111b in FIG. 11 for the first embodiment explicitly disclosing the slice identity and actions 1211a and 1211b for the second embodiment implicitly disclosing the slice identity.

Figure 14:
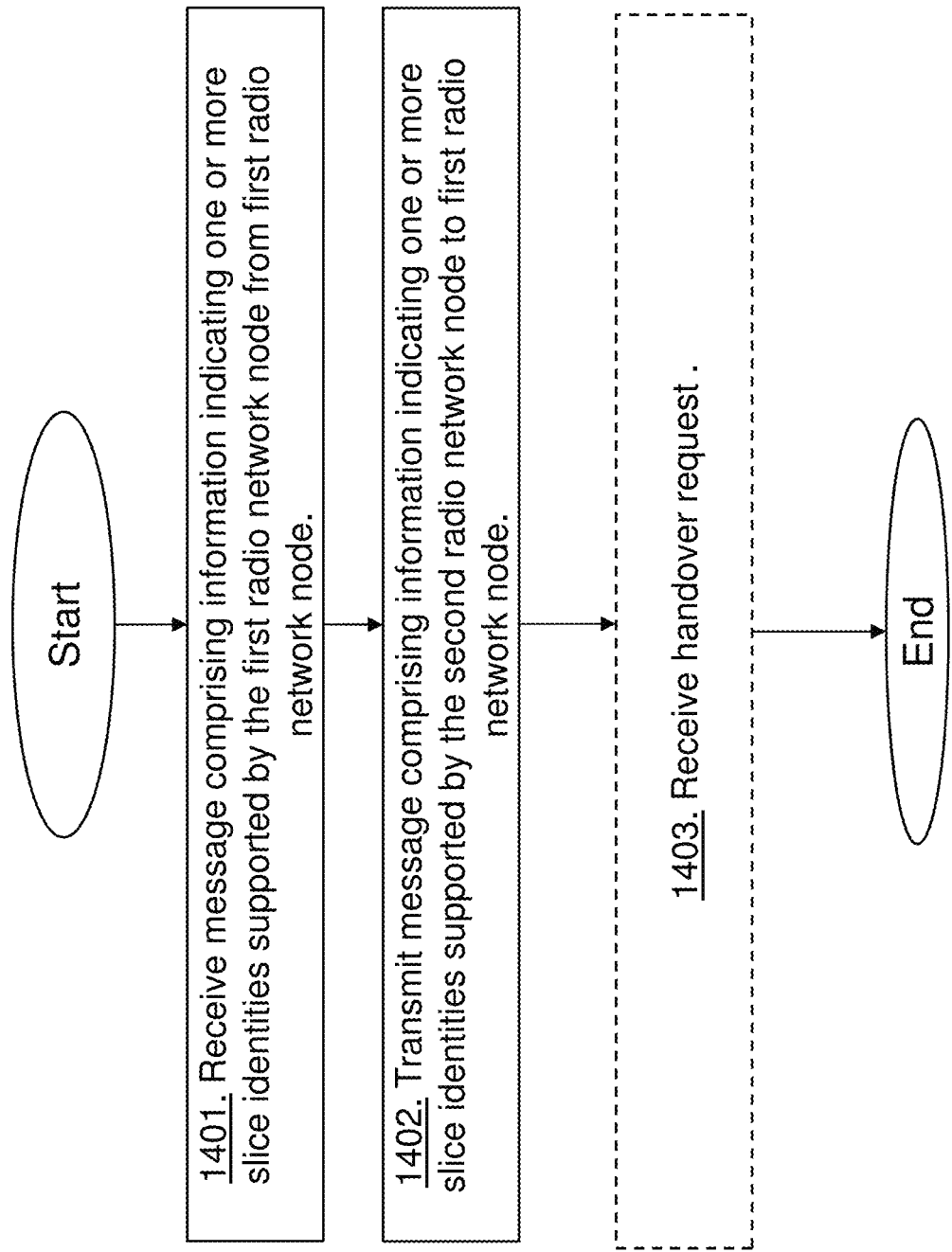
FIG. 14 is a schematic flowchart depicting a method performed by a second radio network node according to embodiments herein.

The method actions performed by the second radio Network node 13 for handling mobility for a wireless device 10 in a communication network 1 according to embodiments herein will now be described with reference to a flowchart depicted in FIG. 14. The actions do not have to be taken in the order stated below, but may be taken in any suitable order. Actions performed in some embodiments are marked with dashed boxes. The communication network 1 comprises partitioned sets of functionalities. Each set of functionalities belongs to a network slice. Each set of functionalities is separated from other sets of functionalities out of a total set of functionalities in the communication network. A first set of functionalities belongs to a first network slice supporting the wireless device 10.

Action 1401:

The second radio network node 13 receives, from a first radio network node 12 in the communication network, a message comprising information indicating one or more slice identities supported by the first radio network node 12. This action corresponds to action 1001 described above in relation to FIG. 10, to action 1101 described above in relation to FIG. 11 and to action 1201 described above in relation to FIG. 12.

Action 1402:

The second radio network node 13 transmits to the first radio network node 12 in the communication network, a response message comprising information indicating one or more slice identities supported by the second radio network node 13. This action corresponds to action 1002 described above in relation to FIG. 10, to action 1102 described above in relation to FIG. 11 and to action 1202 described above in relation to FIG. 12.

Action 1403:

The second radio network node 13 may further receive a handover request to the second radio network node 13, which handover requests comprises an indication of one or more slices supported by the second radio network node 13 decided to perform mobility procedure to by the first radio network node 12. This action corresponds to action 1009 described above in relation to FIG. 10, to action 1111b described above in relation to FIG. 11 and to action 1211b described above in relation to FIG. 12.

Figure 15:
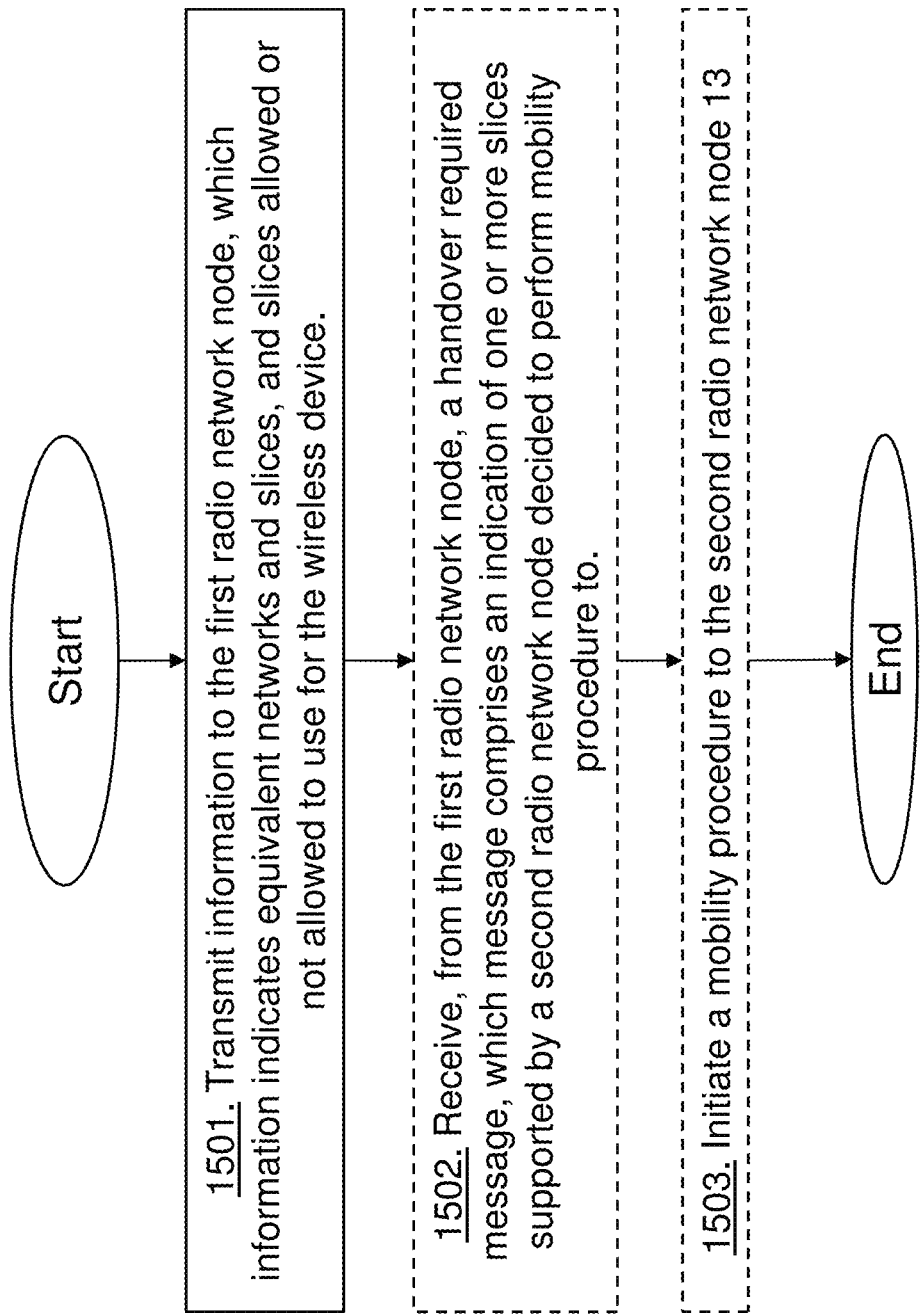
FIG. 15 is a schematic flowchart depicting a method performed by a core network node according to embodiments herein.

The method actions performed by the core network node 19, handling mobility of a wireless device 10 in a communication network 1 according to embodiments herein will now be described with reference to a flowchart depicted in FIG. 15. The actions do not have to be taken in the order stated below, but may be taken in any suitable order. Actions performed in some embodiments are marked with dashed boxes. The communication network 1 comprises partitioned sets of functionalities. Each set of functionalities belongs to a network slice. Each set of functionalities is separated from other sets of functionalities out of a total set of functionalities in the communication network. A first set of functionalities belongs to a first network slice supporting the wireless device 10.

Action 1501:

The core network node 19 transmits information to the first radio network node 12, which information indicates equivalent networks and slices, and slices allowed or not allowed to use for the wireless device 10. In some embodiments herein, the indication transmitted from the core network node 19 may comprise a list of combinations of networks and network slices equivalent to the first network slice associated with the wireless device 10.

According to an embodiment herein, the list may comprise an entry for each equivalent network identifier. Thereby the networks and network slices are explicitly indicated in the message. For each network identifier the message comprises a corresponding list of equivalent network slice identifiers. This may be indicated in the message in the following form:

<PLMN-ID=A><Slice-ID=(a, b, d)><PLMN-ID=C><Sliced D=(i, j, k)> . . . .

According to a further embodiment herein, the list may comprise an entry for each combination of equivalent network identifier and equivalent network slice identifier. This may be indicated in the message in the following form:

<PLMN-ID=A><Sliced D=a><PLMN-ID=A><Slice-ID=b> . . . <PLMN-ID=C><Slice-ID=i><PLMN-ID=C><Slice-ID=j> . . . .

The list of equivalent network slice identifiers may further comprise an indication of the priority of each network slice identifier for each network identifier. Hence, for a specific network, identified by a specific PLMN-ID, a list of network slice identifiers, such as slice-IDs may be provided to the wireless device. The list of slice-IDs may further comprise a priority indication for the slice-IDs for a specific PLMN-ID, thereby the wireless device will be able to determine which of the equivalent networks and network slices it should try to connect to first.

In a second embodiment herein, the indication may however also implicitly indicates equivalent networks and slices, and slices allowed or not allowed to use for the wireless device 10. In this embodiment the indication may e.g. comprise a list of supported TAI The indication may be transmitted from the core network node 19 in a message over an S1AP protocol. The message may e.g. be an Initial Context Setup Request message, or any similar message sent from the core network node 19 as response to the wireless device attaching to a network and a network slice via the core network node 19.

This action 1504 is similar to the action 1004 described above in relation to FIG. 10, action 1103a described above in relation to FIG. 11 and action 1203a described above in relation to FIG. 12.

Action 1502:

The core network node 19 may receive, from a first radio network node 12 in the communication network, a handover required message associated with the first radio network node 12, which handover required message comprises an indication of one or more slices supported by a second radio network node 13 decided, at the first radio network node 12, to perform mobility procedure to.

Action 1503:

The core network node 19 may initiate a mobility procedure to the second radio network node 13, taking the one or more slices supported by the second radio network node 13 into account. The initiating may comprise transmitting information to the second radio network node 13, which information indicates equivalent networks and slices, and slices allowed or not allowed to use for the wireless device 10.

The initiating may be performed based on whether the one or more slices indicated are allowed or not allowed to use for the wireless device 10 in the second radio network node 13.

FIG. 16 is a block diagram depicting the first radio network node 12 for handling mobility of a wireless device 10 in a communication network 1. The communication network 1 comprises partitioned sets of functionalities. Each set of functionalities belongs to a network slice. Each set of functionalities is separated from other sets of functionalities out of a total set of functionalities in the communication network. A first set of functionalities belongs to a first network slice supporting the wireless device 10.

The first radio network node 12 may comprise a processing unit 1601, e.g. one or more processors, configured to perform the methods described herein.

The first radio network node 12 is configured to, e.g. by means of a transmitting module 1602 and/or the processing unit 1601 being configured to, transmit, to a second radio network node 13 in the communication network, a message comprising information indicating one or more slice identities supported by the first radio network node 12.

The first radio network node 12 is configured to, e.g. by means of a receiving module 1603 and/or the processing unit 1601 being configured to, receive, from the second radio network node 13 in the communication network, a response message comprising information indicating one or more slice identities supported by the second radio network node. The indication received from the core network node 19 may comprise a list of combinations of networks and network slices equivalent to the first network slice associated with the wireless device 10 in the first network.

The first radio network node 12 may further be configured to, e.g. by means of the receiving module 1602 and/or the processing unit 1401 being configured to, receive the message from the core network node 19 over a NAS protocol.

The first radio network node 12 may further be configured to, e.g. by means of the receiving module 1602 and/or the processing unit 1401 being configured to, receive a message from the RAN node 12, 13 comprising an indication of one or more networks associated with the cells supported by the RAN node 12, 13 and the network slices supported by the cells for each associated network.

The first radio network node 12 is further configured to, e.g. by means of an obtaining module 1604 and/or the processing unit 1601 being configured to, obtain, during a connection setup of the wireless device 10 to the network slice, a support indication indicating the slice ID the wireless device 10 supports.

The first radio network node 12 is configured to, e.g. by means of a determining module 1605 and/or the processing unit 1601 being configured to, determine to initiate a mobility procedure towards the second radio network node 13 taking the information in the received response message and the obtained support indication into account.

The first radio network node 12 may further be configured to determine to initiate mobility procedures by being configured to, e.g. by means of a selecting module 1606, the determining module 1605 and/or the processing unit 1601 being configured to, select measurements for making a mobility decision based on the information in the received response message and the obtained support indication. select a cell from the second set of cells supported by the second RAN node 13 for which an indicated network and network slices matches one of the combinations of network and network slice equivalent to the first network slice associated with the wireless device 10.

The first radio network node 12 may further be configured to, e.g. by means of a selecting module 1606, the determining module 1605 and/or the processing unit 1601 being configured to, select measurements based on information received from a core network node or other radio network node, which information indicates equivalent networks and slices, and slices allowed or not allowed to use for the wireless device 10.

The first radio network node 12 may further be configured to, e.g. by means of an initiating module 1607, the determining module 1605 and/or the processing unit 1601 being configured to, determine to initiate the mobility procedure by activating one or more measurements on a frequency band of the second radio network node 13. The first radio network node 12 may further be configured to, e.g. by means of the initiating module 1607, the determining module 1605 and/or the processing unit 1601 being configured to, decide to perform mobility procedure to one or more slices of the second radio network node based on the one or more measurements. The first radio network node 12 may further be configured to, e.g. by means of the transmitting module 1602 and/or the processing unit 1601 being configured to, transmit a handover request to the second radio network node 13, which handover request comprises an indication of the decided one or more slices supported by the second radio network node 13.

The first radio network node 12 may further be configured to, e.g. by means of the initiating module 1607, the determining module 1605 and/or the processing unit 1601 being configured to, determine to initiate the mobility procedure by activating one or more measurements on a frequency band of the second radio network node 13, and deciding to perform mobility procedure to one or more slices of the second radio network node based on the one or more measurements. The first radio network node 12 may further be configured to, e.g. by means of the transmitting module 1602 and/or the processing unit 1601 being configured to, transmit a handover required to the core network node, which handover required comprises an indication of the decided one or more slices supported by the second radio network node 13.

The first radio network node 12 further comprises a memory 1608. The memory comprises one or more units to be used to store data on, such as system information, IDLE mode mobility information, network slice information, wireless device IDs, network slice and roaming policies, Slice IDs, applications to perform the methods disclosed herein when being executed, and similar.

The methods according to the embodiments described herein for the first radio network node 12 are respectively implemented by means of e.g. a computer program 1609 or a computer program product, comprising instructions, i.e., software code portions, which, when executed on at least one processor, cause the at least one processor to carry out the actions described herein, as performed by the first radio network node 12. The computer program 1609 may be stored on a computer-readable storage medium 1610, e.g. a disc or similar. The computer-readable storage medium 1610, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Figure 17:
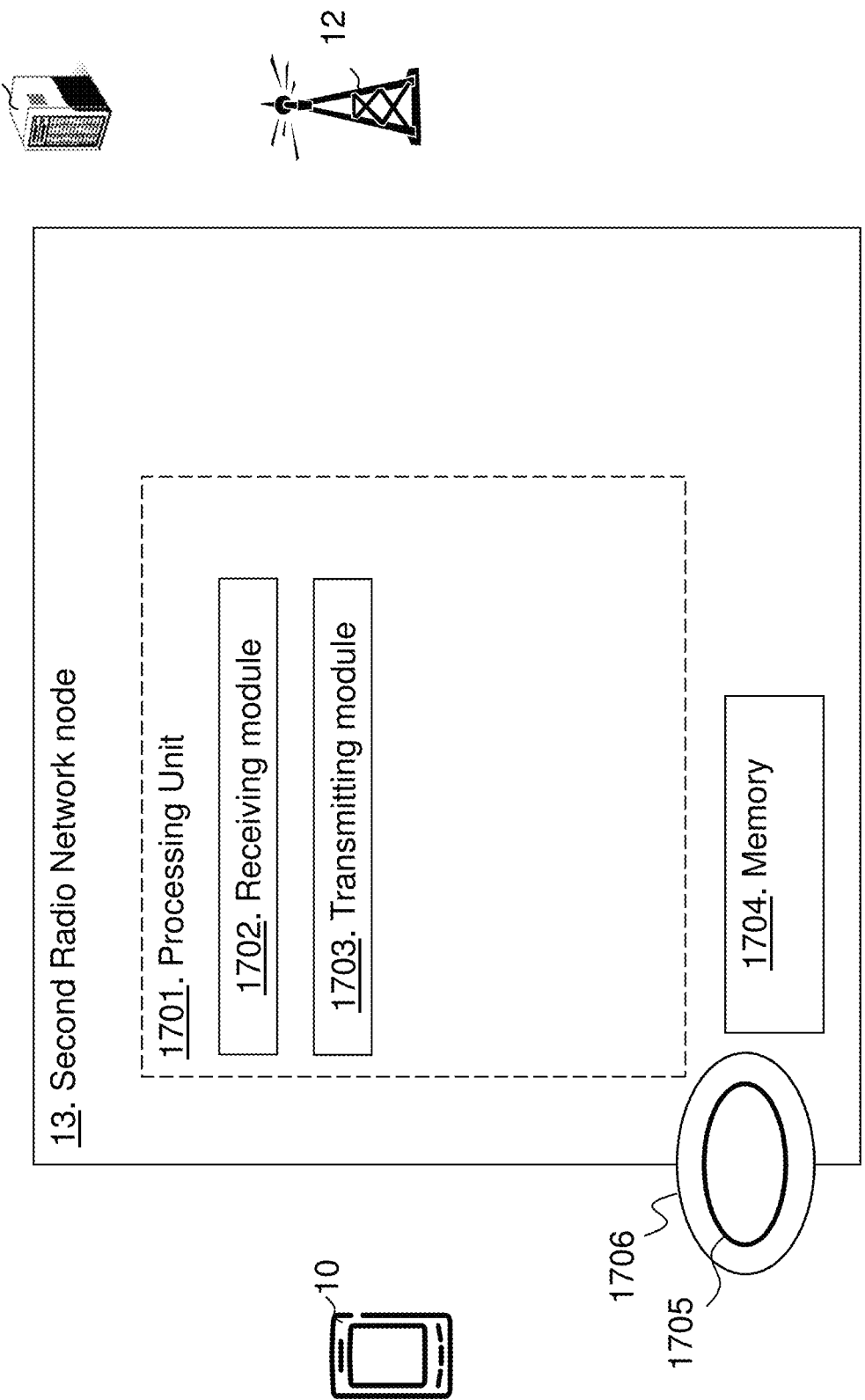
FIG. 17 is a block diagram depicting a second radio network node according to embodiments herein.

FIG. 17 is a block diagram depicting the second radio network node 13 for handling mobility of a wireless device 10 in a communication network 1. The communication network 1 comprises partitioned sets of functionalities. Each set of functionalities belongs to a network slice. Each set of functionalities is separated from other sets of functionalities out of a total set of functionalities in the communication network. A first set of functionalities belongs to a first network slice supporting the wireless device 10. The second radio network node 13 may comprise a processing unit 1701, e.g. one or more processors, configured to perform the methods described herein.

The second radio network node 13 is configured to, e.g. by means of a receiving module 1702 and/or the processing unit 1701 being configured to, receive, from a first radio network node 12 in the communication network, a message comprising information indicating one or more slice identities supported by the first radio network node 12.

The second radio network node 13 is configured to, e.g. by means of a transmitting module 1703 and/or the processing unit 1701 being configured to, transmit a response message comprising information indicating one or more slice identities supported by the second radio network node 13 to the first radio network node 12 in the communication network.

The second radio network node 13 may further be configured to, e.g. by means of the receiving module 1702 and/or the processing unit 1701 being configured to, receive a handover request to the second radio network node 13, which handover requests comprises an indication of one or more slices supported by the second radio network node 13 decided to perform mobility procedure to by the first radio network node 12.

The second radio network node 13 further comprises a memory 1603. The memory comprises one or more units to be used to store data on, such as system information, IDLE mode mobility information, network slice information, wireless device IDs, network slice and roaming policies, Slice IDs, applications to perform the methods disclosed herein when being executed, and similar.

The methods according to the embodiments described herein for the second radio network node 13 are respectively implemented by means of e.g. a computer program 1704 or a computer program product, comprising instructions, i.e., software code portions, which, when executed on at least one processor, cause the at least one processor to carry out the actions described herein, as performed by the second radio network node 13. The computer program 1704 may be stored on a computer-readable storage medium 1705, e.g. a disc or similar. The computer-readable storage medium 1705, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

Figure 18:
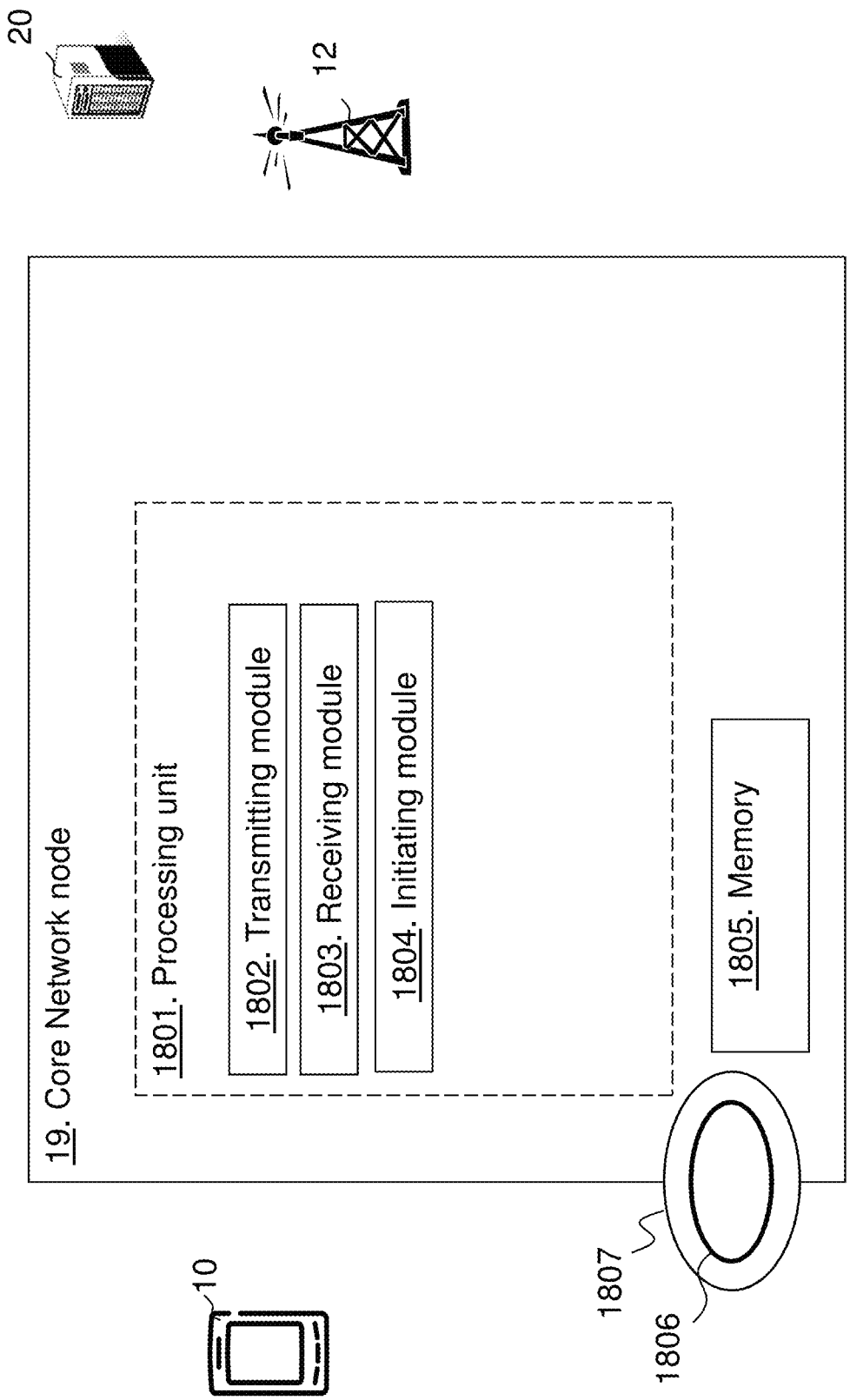
FIG. 18 is a block diagram depicting a core network node according to embodiments herein.

FIG. 18 is a block diagram depicting the core network node 19 for handling mobility of a wireless device 10 in the communication network 1. The communication network 1 comprises partitioned sets of functionalities. Each set of functionalities belongs to a network slice. Each set of functionalities is separated from other sets of functionalities out of a total set of functionalities in the communication network. A first set of functionalities belongs to a first network slice supporting the wireless device 10. The core network node 19 may comprise a processing unit 1801, e.g. one or more processors, configured to perform the methods described herein.

The core network node 19 is configured to, e.g. by means of a transmitting module 1802 and/or the processing unit 1801 being configured to, transmit information to the first radio network node 12, which information indicates equivalent networks and slices, and slices allowed or not allowed to use for the wireless device 10. The core network node 19 may be configured to, e.g. by means of a transmitting module 1802 and/or the processing unit 1801 being configured to, transmit the indication as a list of combinations of networks and network slices equivalent to the network slice associated with the wireless device 10 at the first radio network node 12.

The core network node 19 may be configured to, e.g. by means of a receiving module 1803 and/or the processing unit 1801 being configured to, receive, from a first radio network node 12 in the communication network, a handover required message associated with the first radio network node 12, which handover required message comprises an indication of one or more slices supported by a second radio network node 13 decided, at the first radio network node 12, to perform mobility procedure to.

The core network node 19 may further be configured to, e.g. by means of an initiating module 1804 and/or the processing unit 1801 being configured to, initiate a mobility procedure to the second radio network node 13, taking the one or more slices supported by the second radio network node 13 into account.

The core network node 19 may further be configured to, e.g. by means of the initiating module 1804 and/or the processing unit 1801 being configured to, initiate the mobility procedure by transmitting information to the second radio network node 13, which information indicates equivalent networks and slices, and slices allowed or not allowed to use for the wireless device 10.

The core network node 19 may further be configured to, e.g. by means of the initiating module 1804 and/or the processing unit 1801 being configured to, perform the initiating based on whether the one or more slices indicated are allowed or not allowed to use for the wireless device 10 in the second radio network node 13.

The core network node 19 further comprises a memory 1805. The memory comprises one or more units to be used to store data on, such as, system information, IDLE mode mobility information, network slice information, wireless device IDs, network slice and roaming policies, Slice IDs, applications to perform the methods disclosed herein when being executed, and similar.

The methods according to the embodiments described herein for the core network node 19 are respectively implemented by means of e.g. a computer program 1804 or a computer program product, comprising instructions, i.e., software code portions, which, when executed on at least one processor, cause the at least one processor to carry out the actions described herein, as performed by the core network node 19. The computer program 1804 may be stored on a computer-readable storage medium 1805, e.g. a disc or similar. The computer-readable storage medium 1805, having stored thereon the computer program, may comprise the instructions which, when executed on at least one processor, cause the at least one processor to carry out the actions described herein, as performed by the core network node 19. In some embodiments, the computer-readable storage medium may be a non-transitory computer-readable storage medium.

Figure 19:
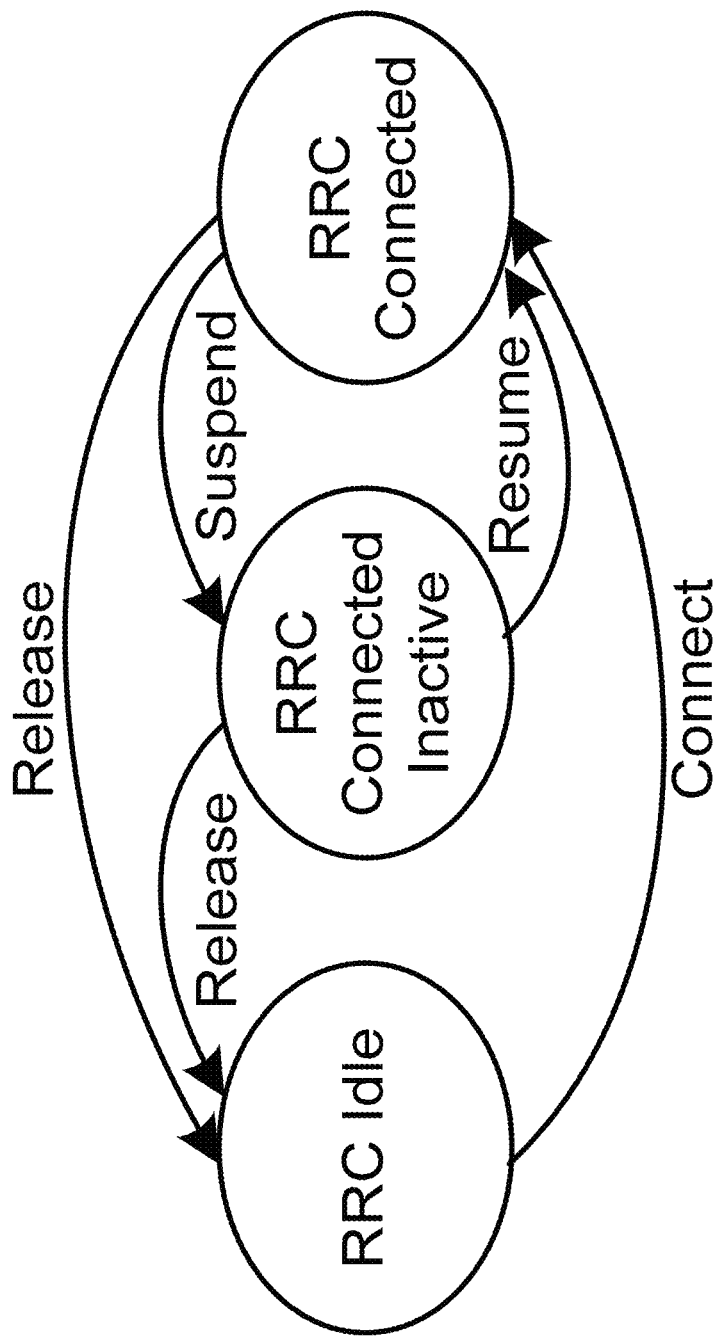
FIG. 19 is a schematic overview depicting states of a wireless device attached to a network.

A novel state model may be proposed for the 5G architecture enabling an efficient sleeping of a wireless device, a fast and lightweight transition from sleeping to active states and joint access optimizations. One likely model to be adopted is the following shown in FIG. 19.

The model consists of three states: "RRC Idle", "RRC Connected" and "RRC Connected Inactive". In the novel model the state transitions from RRC Idle to RRC Connected are expected to occur mainly during the first initial access, such as e.g. when the UE attaches to the network, or as a fallback case, such as e.g. when the devices and/or the network cannot use the previously stored RAN context. As a consequence, this transition is not expected to occur as often as in LTE.

On the other hand, transitions from "RRC Connected Inactive" to "RRC Connected" are expected to occur quite often and should be optimized as a lightweight and fast transition. The novel "RRC Connected Inactive" state designed to be used as the primary sleep state for the 5G access has as one of the characteristics the maintenance of context information by the wireless device and the network when the moves from "RRC Connected" to "RRC Connected Inactive". Some of these characteristics are currently being standardized by 3GPP for LTE as well and may be referred to as Suspended state.

Therefore, when it comes to the wireless device state model assumptions relevant for the embodiments described herein, the described cell selection and cell reselection enhancements may also occur for 5G devices in RRC Idle as currently in LTE. The described cell selection and cell reselection enhancements may also apply for wireless devices in the RRC Connected Inactive state, which may also be referred to as a Dormant state, and also for wireless devices in Suspended state. Although the embodiments herein are described for a wireless device in IDLE mode, the embodiments may be equally applicable in these similar states of the wireless device.

As will be readily understood by those familiar with communications design, the description applied to a 'cell' is equally applicable to all UE-based mobility, such as e.g. selection and re-selection, in NX even if the concept/term 'cell' is replaced by a corresponding concept/term such as e.g. a beam, a beam group or service area, which describes a geographical area covered by a RAN node.

Embodiments herein relate to a network with network slices i.e. a (core or RAN or both) network with partitioned sets of functionalities wherein the core network node 19, the wireless device 10 and/or the RAN node 12 may support the first set of functionalities out of the total set of functionalities in the network of the communication network. The first set of functionalities belongs to the first network slice of the network, and is separated from another set of functionalities out of the total set of functionalities in the network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

Although the embodiments herein are described for an LTE-like architecture it shall be noted that they are equally applicable to any architecture based on an evolution of the S1 interface.

When using the word "comprise" or "comprising" it shall be interpreted as non-limiting, i.e. meaning "consist at least of". When using the word "set" herein, it shall be interpreted as meaning "one or more".

In the embodiments herein, being associated with shall be interpreted as somehow being related to, this may e.g. be the wireless device 10 camping on or being connected to a cell which has support for the network and the network slice and/or the wireless device having local information regarding the network and the network slice, such as e.g. having locally stored the network as a home network indicated with a HPLMN and the network slice being stored as a home network slice supporting the wireless device in the home network.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first radio network node for handling mobility of a wireless device in a communication network, which communication network comprises partitioned sets of functionalities wherein each set of functionalities belongs to a network slice, and wherein a set of functionalities is separated from other sets of functionalities out of a total set of functionalities in the communication network, the method comprising:

transmitting, to a second radio network node in the communication network, a message comprising information indicating one or more slice identities supported by the first radio network node;

receiving from the second radio network node in the communication network, a response message comprising information indicating one or more slice identities supported by the second radio network node;

obtaining, during a connection setup of the wireless device to the network slice, a support indication indicating the slice ID the wireless device supports; and determining to initiate a mobility procedure towards the second radio network node taking the information in the received response message and the obtained support indication into account.

2. A method according to claim 1, wherein the information in the transmitted message comprises explicit values of supported one or more networks and one or more slice identities and/or the information in the received response message comprises explicit values of supported one or more networks and one or more slice identities.

3. A method according to claim 1, wherein the information in the transmitted message comprises values of supported one or more networks and one or more tracking area codes, cell global identities, or cell identities; and/or the information in the received response message comprises values of supported one or more networks and one or more tracking area codes, cell group identities, or cell identities.

4. A method according to claim 1, wherein determining to initiate the mobility procedure comprises:

selecting measurements for making a mobility decision based on the information in the received response message and the obtained support indication.

5. A method according to claim 4, wherein the selecting is further based on information received from a core network node or other radio network node, which information indicates equivalent networks and slices, and slices allowed or not allowed to use for the wireless device.

6. A method according to claim 1, wherein determining to initiate the mobility procedure further comprises activating one or more measurements on a frequency band of the second radio network node;

deciding to perform mobility procedure to one or more slices of the second radio network node based on the one or more measurements; and transmit a handover request to the second radio network node, which handover request comprises an indication of the decided one or more slices supported by the second radio network node.

7. A method according to claim 6, wherein the handover request comprises information, which information indicates equivalent networks and slices, and slices allowed or not allowed to use for the wireless device.

8. A method according to claim 1, wherein the mobility procedure comprises:

activating one or more measurements on a frequency band of the second radio network node, deciding to perform mobility procedure to one or more slices of the second radio network node based on the one or more measurements, and transmit a handover required to the core network node, which handover required comprises an indication of the decided one or more slices supported by the second radio network node.

9. A method according to claim 1, wherein the information further indicates a frequency priority order used when determining to initiate the mobility procedure.

10. A method performed by a second radio network node for handling mobility of a wireless device in a communication network, which communication network comprises partitioned sets of functionalities wherein each set of functionalities belongs to a network slice, and wherein a set of functionalities is separated from other sets of functionalities out of a total set of functionalities in the communication network, the method comprising:

receiving, from a first radio network node in the communication network, a message comprising information indicating one or more slice identities supported by the first radio network node; and transmitting to the first radio network node in the communication network, a response message comprising information indicating one or more slice identities supported by the second radio network node.

11. A method according to claim 10, further comprising receiving a handover request to the second radio network node, which handover requests comprises an indication of one or more slices supported by the second radio network node decided to perform mobility procedure to by the first radio network node.

12. A method performed by a core network node for handling mobility of a wireless device in a communication network, which communication network comprises partitioned sets of functionalities wherein each set of functionalities belongs to a network slice, and wherein a set of functionalities is separated from other sets of functionalities out of a total set of functionalities in the communication network, the method comprising:

transmitting information to the first radio network node, which information indicates equivalent networks and slices, and slices allowed or not allowed to use for the wireless device.

13. A method according to claim 12, further comprising receiving, from a first radio network node in the communication network, a handover required message associated with the first radio network node, which handover required message comprises an indication of one or more slices supported by a second radio network node decided, at the first radio network node, to perform mobility procedure to; and initiating a mobility procedure to the second radio network node, taking the one or more slices supported by the second radio network node into account.

14. The method according to claim 13, wherein the initiating comprises transmitting information to the second radio network node, which information indicates equivalent networks and slices, and slices allowed or not allowed to use for the wireless device.

15. The method according to claim 13, wherein the initiating is performed based on whether the one or more slices indicated are allowed or not allowed to use for the wireless device in the second radio network node.

16. A first radio network node for handling mobility of a wireless device in a communication network, which communication network comprises partitioned sets of functionalities wherein each set of functionalities belongs to a network slice, and wherein a set of functionalities is separated from other sets of functionalities out of a total set of functionalities in the communication network, wherein the first radio network node is configured to:

transmit, to a second radio network node in the communication network, a message comprising information indicating one or more slice identities supported by the first radio network node;

receive, from the second radio network node in the communication network, a response message comprising information indicating one or more slice identities supported by the second radio network node;

obtain, during a connection setup of the wireless device to the network slice, a support indication indicating the slice ID the wireless device supports; and determine to initiate a mobility procedure towards the second radio network node taking the information in the received response message and the obtained support indication into account.

17. The first radio network node according to claim 16, wherein the first radio network node is configured to determine to initiate mobility procedures by being configured to select measurements for making a mobility decision based on the information in the received response message and the obtained support indication.

18. The first radio network node according to claim 17, wherein the first radio network node is further configured to select measurements based on information received from a core network node or other radio network node, which information indicates equivalent networks and slices, and slices allowed or not allowed to use for the wireless device.

19. The first radio network node according to claim 16, wherein the first radio network node is configured to determine to initiate the mobility procedure by activating one or more measurements on a frequency band of the second radio network node, and deciding to perform mobility procedure to one or more slices of the second radio network node based on the one or more measurements and to transmit a handover request to the second radio network node (13), which handover request comprises an indication of the decided one or more slices supported by the second radio network node.

20. The first radio network node according to claim 16, wherein the first radio network node is configured to determine to initiate the mobility procedure by activating one or more measurements on a frequency band of the second radio network node, and deciding to perform mobility procedure to one or more slices of the second radio network node based on the one or more measurements and to transmit a handover required to the core network node, which handover required comprises an indication of the decided one or more slices supported by the second radio network node.

21. A second radio network node for handling mobility of a wireless device in a communication network, which communication network comprises partitioned sets of functionalities wherein each set of functionalities belongs to a network slice, and wherein a set of functionalities is separated from other sets of functionalities out of a total set of functionalities in the communication network, wherein the second radio network node is configured to:
receive, from a first radio network node in the communication network, a message comprising information indicating one or more slice identities supported by the first radio network node; and
transmit to the first radio network node in the communication network, a response message comprising information indicating one or more slice identities supported by the second radio network node.

22. The second radio network node according to claim 21, wherein the second radio network node is further configured to receive a handover request to the second radio network node, which handover requests comprises an indication of one or more slices supported by the second radio network node decided to perform mobility procedure to by the first radio network node.

23. A core network node for handling mobility of a wireless device in a communication network, which communication network comprises partitioned sets of functionalities wherein each set of functionalities belongs to a network slice, and wherein a set of functionalities is separated from other sets of functionalities out of a total set of functionalities in the communication network, wherein the core network node is configured to:
transmit information to the first radio network node, which information indicates equivalent networks and slices, and slices allowed or not allowed to use for the wireless device.

24. The core network node according to claim 23, wherein the core network node is further configured to:
receive, from a first radio network node in the communication network, a handover required message associated with the first radio network node, which handover required message comprises an indication of one or more slices supported by a second radio network node decided, at the first radio network node, to perform mobility procedure to; and
initiate a mobility procedure to the second radio network node, taking the one or more slices supported by the second radio network node into account.

25. The core network node according to claim 24, wherein the core network node is configured to initiate the mobility procedure by transmitting information to the second radio network node, which information indicates equivalent networks and slices, and slices allowed or not allowed to use for the wireless device.

26. The core network node according to claim 24, wherein the core network node is configured to perform the initiating based on whether the one or more slices indicated are allowed or not allowed to use for the wireless device in the second radio network node.

27. A computer program comprising a non-transitory computer readable medium storing instructions, which, when executed on at least one processor, cause the at least one processor to carry out the method according to claim 1, as performed by the wireless device, the RAN node or the core network node.

* * * * *